(12) United States Patent
Gulak

(10) Patent No.: US 8,157,043 B2
(45) Date of Patent: Apr. 17, 2012

(54) MOTORIZED CYCLE

(75) Inventor: Benjamin Gulak, Milton (CA)

(73) Assignee: BPG Recreational Inc., Toronto (CA)

( * ) Notice: Subject to any disclaimer, the term of this patent is extended or adjusted under 35 U.S.C. 154(b) by 0 days.

(21) Appl. No.: 12/902,941

(22) Filed: Oct. 12, 2010

(65) Prior Publication Data

US 2011/0139520 A1  Jun. 16, 2011

Related U.S. Application Data

(63) Continuation of application No. 12/113,330, filed on May 1, 2008, now abandoned.

(60) Provisional application No. 60/924,228, filed on May 4, 2007, provisional application No. 61/040,631, filed on Mar. 28, 2008.

(51) Int. Cl.
  *B62D 61/00* (2006.01)

(52) U.S. Cl. ........................................ 180/218; 180/7.1

(58) Field of Classification Search .................. 180/218, 180/7.1, 8.1, 65.8, 907, 5.26, 6.5, 13, 206, 180/252, 264; 280/5.28, 5.38, 208, 209, 280/215, 266, 282
See application file for complete search history.

(56) References Cited

U.S. PATENT DOCUMENTS

| | | | | | |
|---|---|---|---|---|---|
| 5,121,809 | A | * | 6/1992 | Sbarro | 180/223 |
| 5,692,577 | A | * | 12/1997 | Dornbusch et al. | 180/16 |
| 6,561,294 | B1 | * | 5/2003 | Kamen et al. | 180/21 |
| 7,004,271 | B1 | * | 2/2006 | Kamen et al. | 180/21 |
| 7,006,901 | B2 | * | 2/2006 | Wang | 701/1 |
| 7,350,787 | B2 | * | 4/2008 | Voss | 280/5.5 |
| 7,481,291 | B2 | * | 1/2009 | Nishikawa | 180/218 |
| 2003/0205419 | A1 | * | 11/2003 | Kamen et al. | 180/21 |
| 2006/0086544 | A1 | * | 4/2006 | Kamen et al. | 180/21 |
| 2007/0246903 | A1 | * | 10/2007 | Melcher | 280/124.103 |
| 2008/0105471 | A1 | * | 5/2008 | Kamen et al. | 180/7.1 |
| 2008/0245594 | A1 | * | 10/2008 | Ishii et al. | 180/218 |

* cited by examiner

*Primary Examiner* — Tashiana Adams
(74) *Attorney, Agent, or Firm* — Osler, Hoskin & Harcourt LLP

(57) ABSTRACT

There is provided a motorized cycle comprising a frame, a seat mounted upon the frame, a plurality of suspensions mounted to the frame, a plurality of wheels each coupled to a suspension wherein the operation of the motorized cycle is based on the physical position and movements of the rider. Also provided is a suspension system for a motorized cycle comprising a plurality of suspensions each coupled to the frame of the motorized cycle, and a plurality of wheels each coupled to a suspension such that each wheel is able to move relative to the other wheels and the frame. According to another aspect, there is provided a rider positioning system for a motorized cycle comprising handle bars and a seat wherein the movement of the handle bars affects the movement of the seat. There is also provided a control system for operating a motorized cycle comprising a control board including software, a plurality of sensors providing inputs to the control board, a plurality of wheels wherein each wheel is instructed by the control board to accelerate or decelerate to maintain the center of gravity of the motorized cycle.

9 Claims, 18 Drawing Sheets

MOTORIZED CYCLE

CROSS-REFERENCE TO RELATED APPLICATIONS

This application is a continuation of U.S. application Ser. No. 12/113,330, filed May 1, 2008 now abandoned, which claims priority to U.S. Provisional Application No. 61/040,631, filed Mar. 28, 2008, and U.S. Provisional Application No. 60/924,228, filed May 4, 2007. The contents of both prior applications are hereby incorporated by reference in their entirety.

FIELD OF THE INVENTION

The present invention relates to transportation vehicles, and more particularly to a motorized cycle for transporting individuals where the motorized cycle has the ability to navigate conventional roads as well as smaller spaces that are not accessible to larger vehicles in high populated and dense areas.

BACKGROUND OF THE INVENTION

Transportation is one of the most important challenges faced by individuals in the modern world. As cities throughout the world grow larger and more complex, individuals who require transportation face more complex challenges relating to cost, efficiency and timeliness. These challenges are also present in less densely populated areas, where individuals are often highly dependant on transportation to accomplish their basic needs such as shopping, attending work and school, and visiting family and friends.

Cars and trucks are popular methods of transportation, but this option is limited because of the high cost of owning such a vehicle. Other people are concerned about pollution that cars and trucks emit to the environment.

The acceptance by much of the world that greenhouse gas emissions are responsible for global warming has created a need for transportation vehicles, such as electric cars, that are less harmful to the environment. Unfortunately, such vehicles are in the early stages of development and the cost of owning such a vehicle is prohibitive for many people. In some places, smaller vehicles such as scooters and motorcycles have enjoyed wide acceptance because they are inexpensive and are less harmful to the environment compared to cars and trucks. The gear, braking and steering systems of scooters and motorcycles, however, are often complex to use and involve a significant amount of training to operate safely. Furthermore, many scooters and motorcycles are heavy, which adds additional cost, and makes them cumbersome to use by a single person.

The operation of conventional bicycles involves virtually no pollution and has wide acceptance in modern society. Bicycles suffer from different limitations, however, mainly in relation to speed, safety and rider fatigue involved with operating such a vehicle.

In view of these and other known deficiencies in the art, there remains a need for improvements.

BRIEF SUMMARY OF THEE INVENTION

The present invention relates to a motorized cycle for transporting one or more individuals on conventional roads and in smaller spaces that are not accessible to a car.

In one aspect of the present invention, there is provided a motorized cycle comprising: a frame, a seat mounted on the frame for supporting a rider seated on the motorized cycle, handle bars coupled to the frame, a plurality of suspensions coupled to the frame, a plurality of wheels where each is coupled to a suspension, one or more motors for driving the wheels, a control mechanism for allowing the rider to operate the motorized cycle where a least two of the wheels are laterally displaced relative to each other.

In another embodiment, there is provided a motorized cycle comprising: a frame, a seat mounted to the frame for supporting a rider of the motorized cycle, handle bars coupled to the frame, a plurality of suspensions coupled to the frame, a plurality of wheels where each is coupled to a suspension, one or more motors for driving the wheels, a control mechanism for allowing the rider to operate the motorized cycle where each of the suspensions is able to move relative to each of the other suspensions.

In another aspect, there is provided a motorized cycle comprising: a frame, a seat mounted to the frame for supporting the rider of the motorized cycle, handle bars coupled to the frame, a plurality of suspensions coupled to the frame, a plurality of wheels where each is coupled to a suspension, a plurality of motors for driving the wheels, and a driving mechanism whereby the motorized cycle is controlled by the physical position of the rider in the front-back direction and the side-to-side direction.

For a motorized cycle comprising a frame and a plurality of wheels laterally displaced relative to each other, there is provided a suspension system comprising: a plurality of elements where each is movably coupled to the frame at one end and one of the plurality of wheels at the other end such that each element and its associated wheel can move relative to the frame and each of the other elements.

For a motorized cycle comprising a frame and a plurality of wheels laterally displaced relative to each other, there is also provided a rider positioning system comprising: a seat coupled to the frame and handle bars coupled to the frame such that the seat and the handle bars are able to move relative to one another while the motorized cycle is operational.

For a motorized cycle comprising a frame and a plurality of wheels laterally displaced relative to each other, there is also provided a control system comprising: a control board including an algorithm, a plurality of sensors providing inputs to the control board, a plurality of motors receiving instructions from the control board wherein the algorithm is operable to maintain the center of gravity of the motorized cycle by instructing the motors to accelerate or decelerate.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention and in which.

DETAILED DESCRIPTION OF THE EMBODIMENTS

Exterior of the Motorized Cycle

Figure 1:
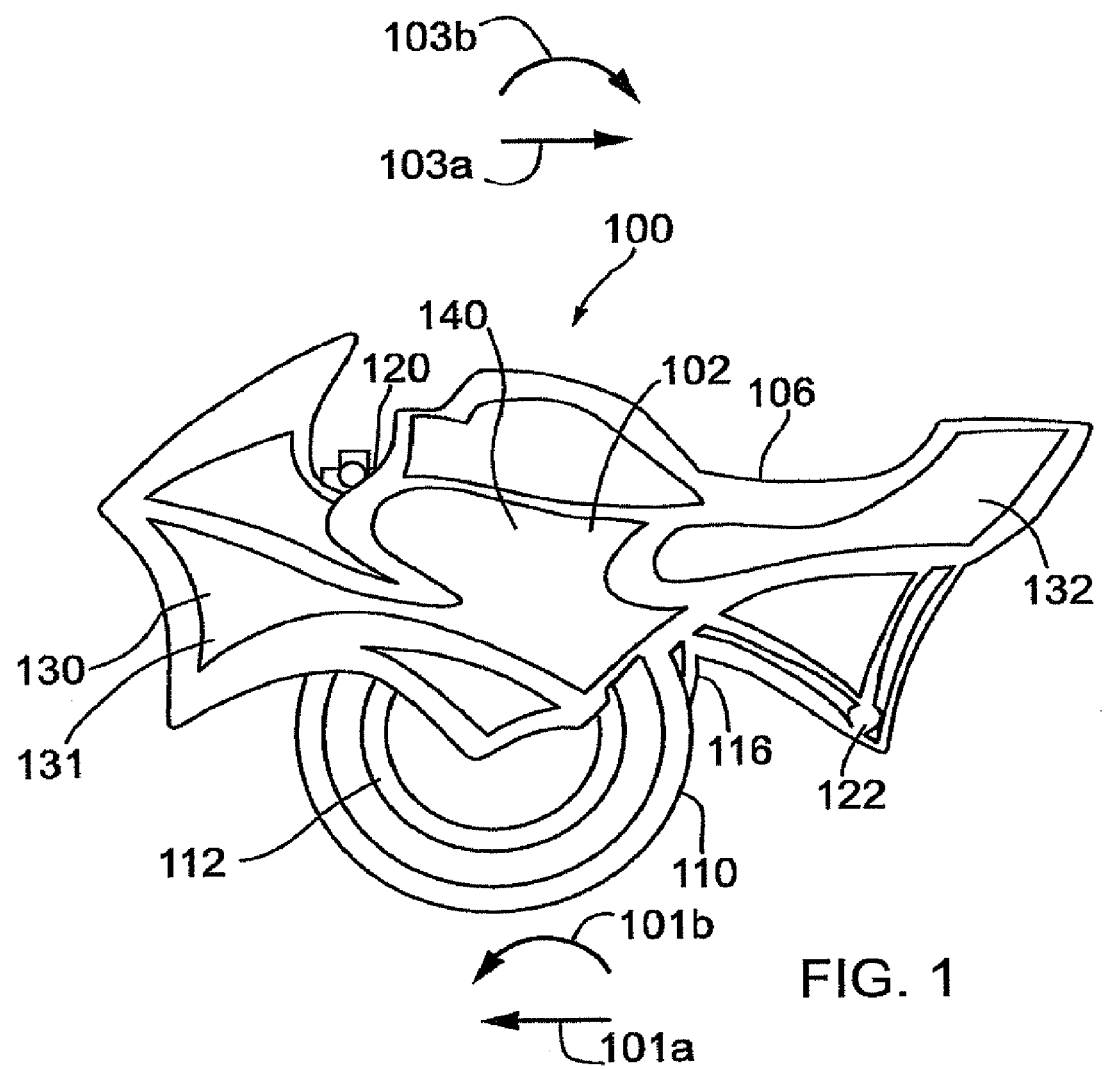
FIG. 1 shows in diagrammatic form a profile view of a motorized cycle according to an aspect of the present invention.

Reference is first made to FIG. 1 which shows in diagrammatic form a profile view of a motorized cycle 100 according to one embodiment of the present invention.

Motorized cycle 100 comprises a frame (not shown), a body 102 including seat 106, handle bars 120, foot pegs 122 and two tires indicated individually by references 110 and 116 that are mounted upon wheel 112 and another wheel (not shown) respectively. The motorized cycle 100 has a front 130, a back 132, a left side 140 and a right side (not shown). The motorized cycle 100 tilts in the direction of arrow 101b as it travels in the direction of arrow 101a and tilts in the direction of arrow 103b as it travels in the direction of arrow 103a. According to an embodiment, a pneumatic cylinder operating as a kickstand extends from the nose 131 or any other part of the body 102 to support the motorized cycle 100 while it is at rest. According to another embodiment, the motorized cycle 100 is self-balancing and the distance between tires 111) and 116 is sufficient to support the motorized cycle 100 in a stable position while it is at rest.

Figure 2:
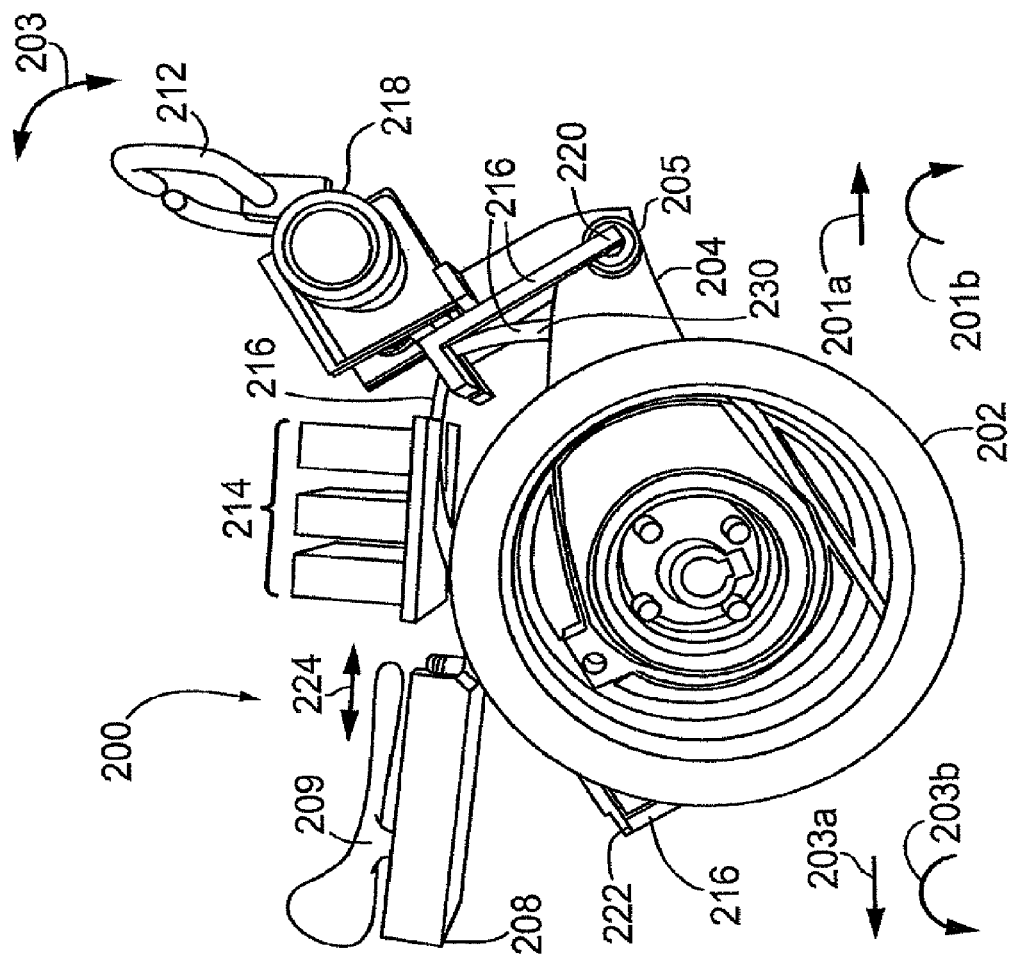
FIG. 2 shows in diagrammatic form a profile view of a motorized cycle without a body according to another aspect of the present invention.

FIG. 2 illustrates a motorized cycle 200 according to another aspect of the present invention. Motorized cycle 200 comprises a frame 216, handle bars 212, a right motor 218, a right wheel 202, a right swing arm 204 which rotates about right pivot 205, a battery pack 214 which may include one or more batteries, a seat mount 208 and a seat 209. Frame 216 includes a front end 220, a back end 222, a right side 230 and a left side (not shown). The left side of the motorized cycle 200 has a corresponding motor, swing arm, pivot and wheel. The motorized cycle 200 is a "naked" version of the motorized cycle 100 as will be appreciated by those skilled in the art. It will also be appreciated that a body or cover may enclose any component of the motorized cycle 200 to create a partially "naked" motorized cycle 200. The seat 209 of the motorized cycle 200 is moveable in the direction of arrow 224 while the motorized cycle 200 is in operation. In an aspect, the seat 209 is operatively coupled to handle bars 212 such that the movement of handle bars 212 in the directions of arrow 203 causes the seat 209 to move in a corresponding way in the directions of arrow 224.

Suspensions of the Motorized Cycle

Figure 3A:
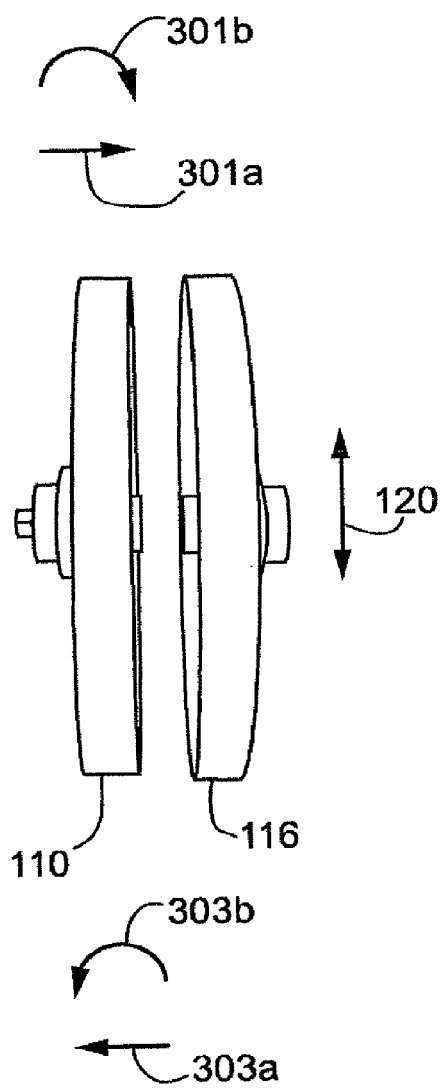
FIGS. 3(a) and 3(b) show in diagrammatic form the movement of the tires in relation to each other for the motorized cycle of FIGS. 1 and 2.
Figure 3B:
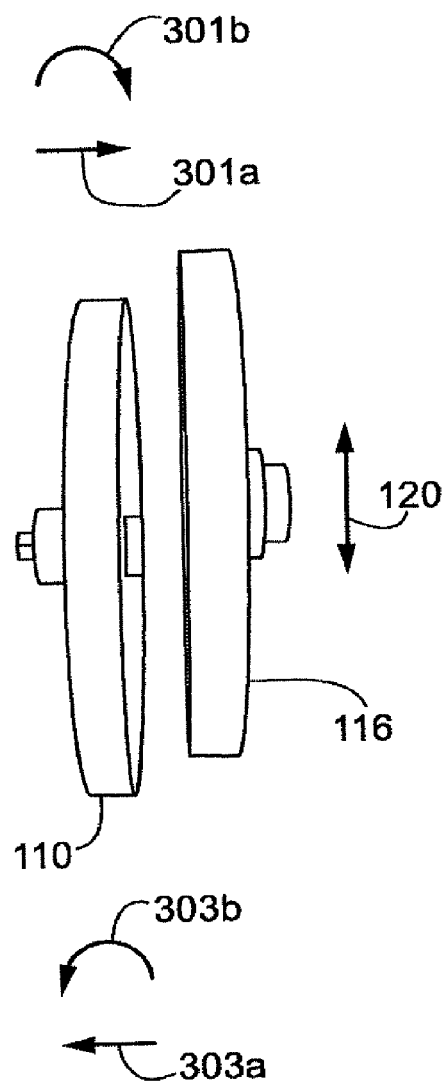

Reference is next made to FIGS. 3(a) and 3(b) which illustrate from a rear position the movement of the tires 110 and 116 in relation to each other according to an embodiment of the present invention. According to this embodiment, the suspensions of tire 110 and tire 116 are independent from each other.

FIG. 3(a) illustrates the position of the tires 110 and 116 in relation to each other when the motorized cycle is at rest or is moving on a flat surface in a straight line. As shown, there is no relative vertical displacement between the tires 110 and 116 in the direction of arrow 120.

FIG. 3(b) illustrates the position of tires 110 and 116 in relation to each other when the motorized cycle of the present invention encounters an irregular surface or the motorized cycle is riding on an angled surface. If the tire 116 encounters a bump on the contact surface while the motorized cycle is traveling, the suspension (not shown) of tire 116 will move up in relation to the suspension (not shown) of tire 110. Similarly, if tire 110 encounters a bump on the contact surface, the suspension of tire 110 will move up in relation to the suspension of tire 116. These independent suspensions allow tires 110 and 116 to remain in contact with the surface when the surface is not smooth or uneven. The dual independent suspension system also allows the motorized cycle to encounter significant irregularities on the contact surface without disturbing the smoothness of the ride. As an example, the dual independent suspension system allows the motorized cycle to travel with one tire riding on a curb (i.e. tire 116) and the other tire riding on a road (i.e. tire 110). From the rider's perspective, the stability of the motorized cycle is the same as though the motorized cycle is traveling with both tires on the road.

Figure 4:
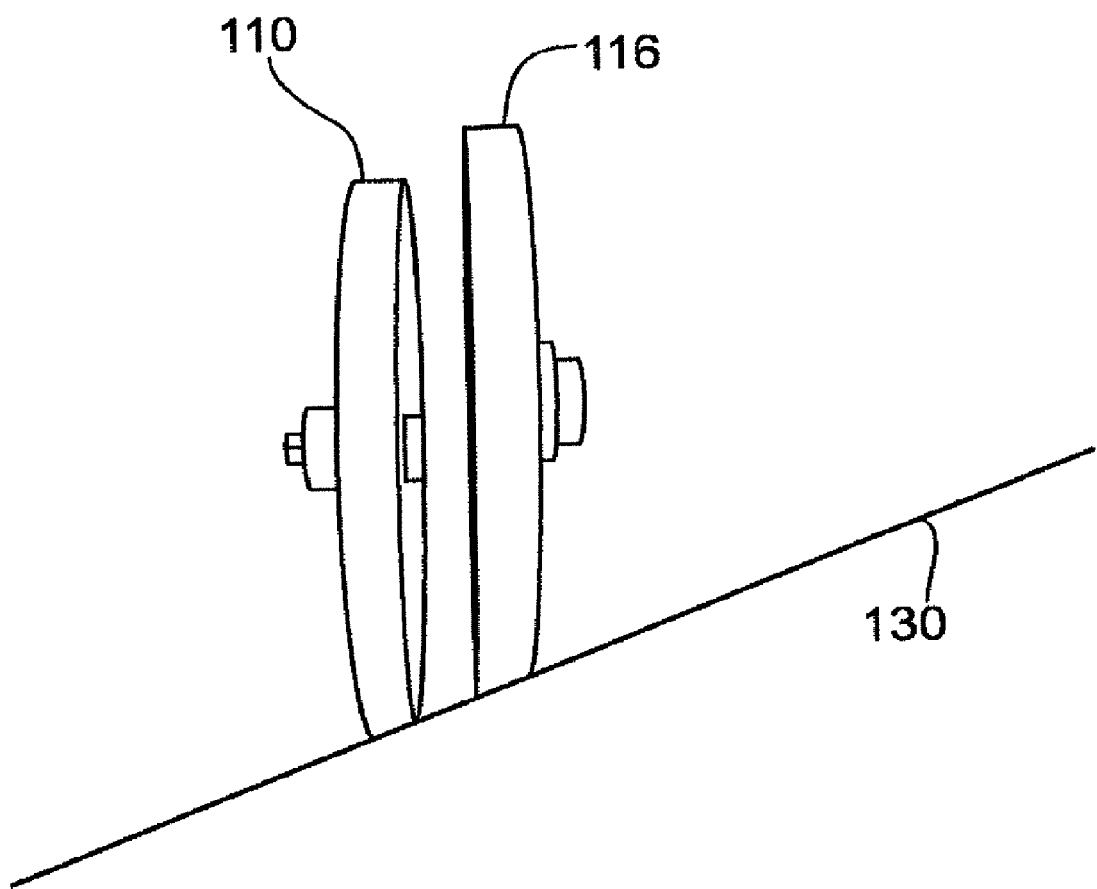
FIG. 4 shows in diagrammatic form the movement of tires in relation to each other for the motorized cycle of FIG. 2 while the motorized cycle is traveling an angled surface.

FIG. 4 illustrates the position of tires 110 and 116 in relation to each other while the motorized cycle of the present invention is traveling on an angled surface 130 such as the side of a hill. The dual independent suspension system allows the motorized cycle to navigate the angled surface 130 without changing the center of gravity of the motorized cycle. Because the center of gravity of the motorized cycle does not change, the motorized cycle is able to proceed in a straight line without turning unless desired by the rider. The rider is able to cause the motorized cycle to turn to either side by leaning in the direction of the desired turn as is described later in this document.

Figure 5:
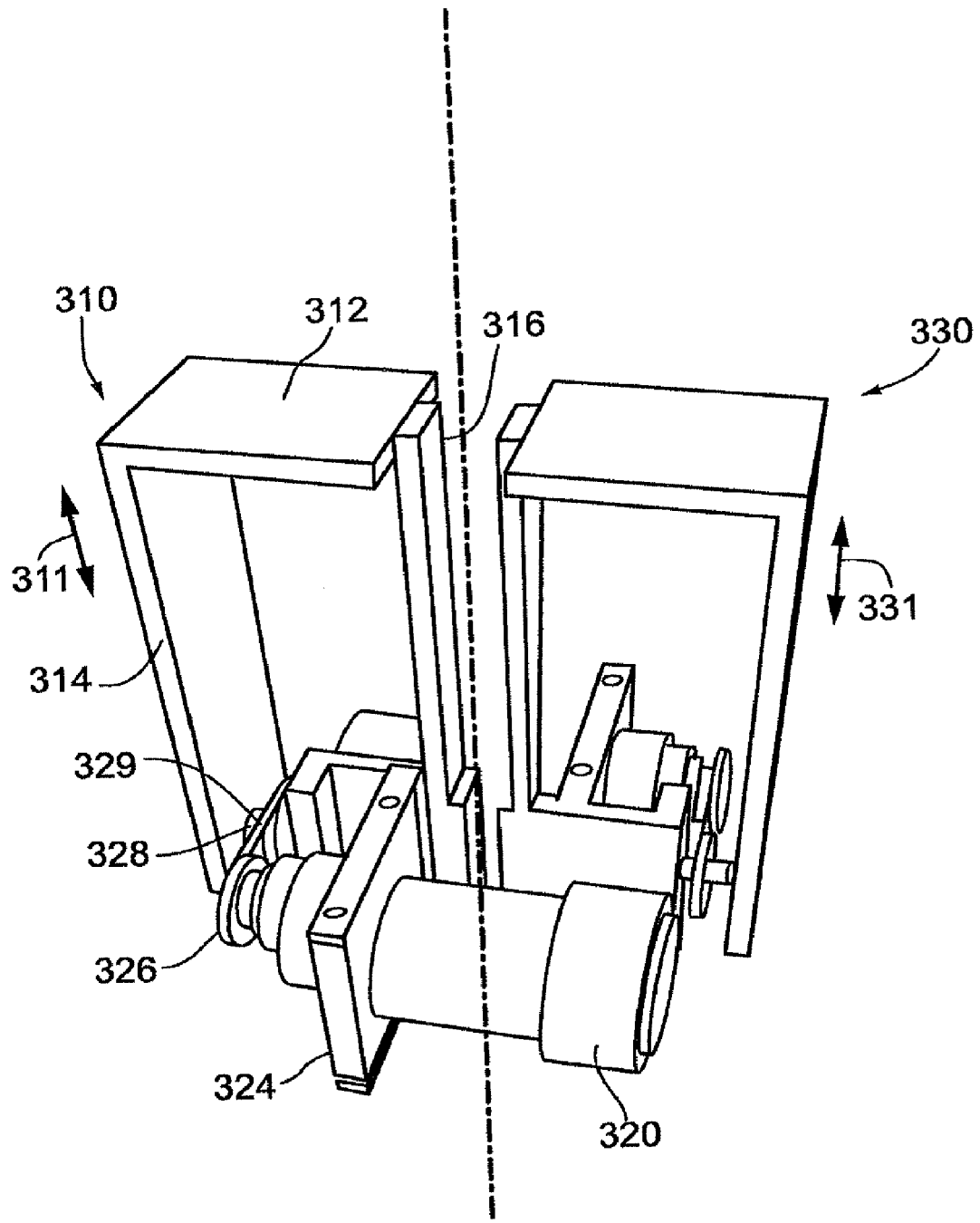
FIG. 5 shows in diagrammatic the suspensions of each wheel for the motorized cycle of FIG. 1.

Reference is next made to FIG. 5 which shows in diagrammatic form two independent suspensions for the motorized cycle 100 according to an embodiment of the present invention. As shown in FIG. 5, the suspension at the left is indicated generally be reference 310 and the suspension at the right is indicated generally by reference 330. The left suspension 310 comprises a top bracket 312, an outer slider 314 and an inner slider 316. The outer slider 314 and the inner slider 316 are elements that interface with the frame (not shown) of the motorized cycle 100 to allow the left suspension 310 to slide up and down in the direction of arrow 311. The components of the left suspension 310 are bolted together. In other embodiments, the components of the left suspension 310 are welded together or are attached together by any suitable means. The right suspension 330 comprises similar components as the left suspension 310 that are also attached together in a like manner. The right suspension 330 is allowed to slide up and down in the direction of arrow 331.

According to an embodiment of the present invention, the left suspension 310 may also include a motor 320, a motor mount 324, a motor pulley 326, a belt or chain 329 and a wheel pulley 328. As will be appreciated by a person skilled in the art, the motor 320 drives the motor pulley 326, which in turn is coupled to and drives the wheel pulley 328 via a chain or belt 329. Chain or belt 329 is operatively connected to a wheel (not shown) so as to cause the wheel to rotate. The position of the motor 320 according to the embodiment illustrated in FIG. 5 allows for an efficient use of space as motor 320 lies within a portion of the opposite wheel (not shown, which is coupled to the right suspension 330). According to other embodiments, motor 320 may be connected to the top bracket 312 or to other components of the motorized cycle 100.

Figure 6:
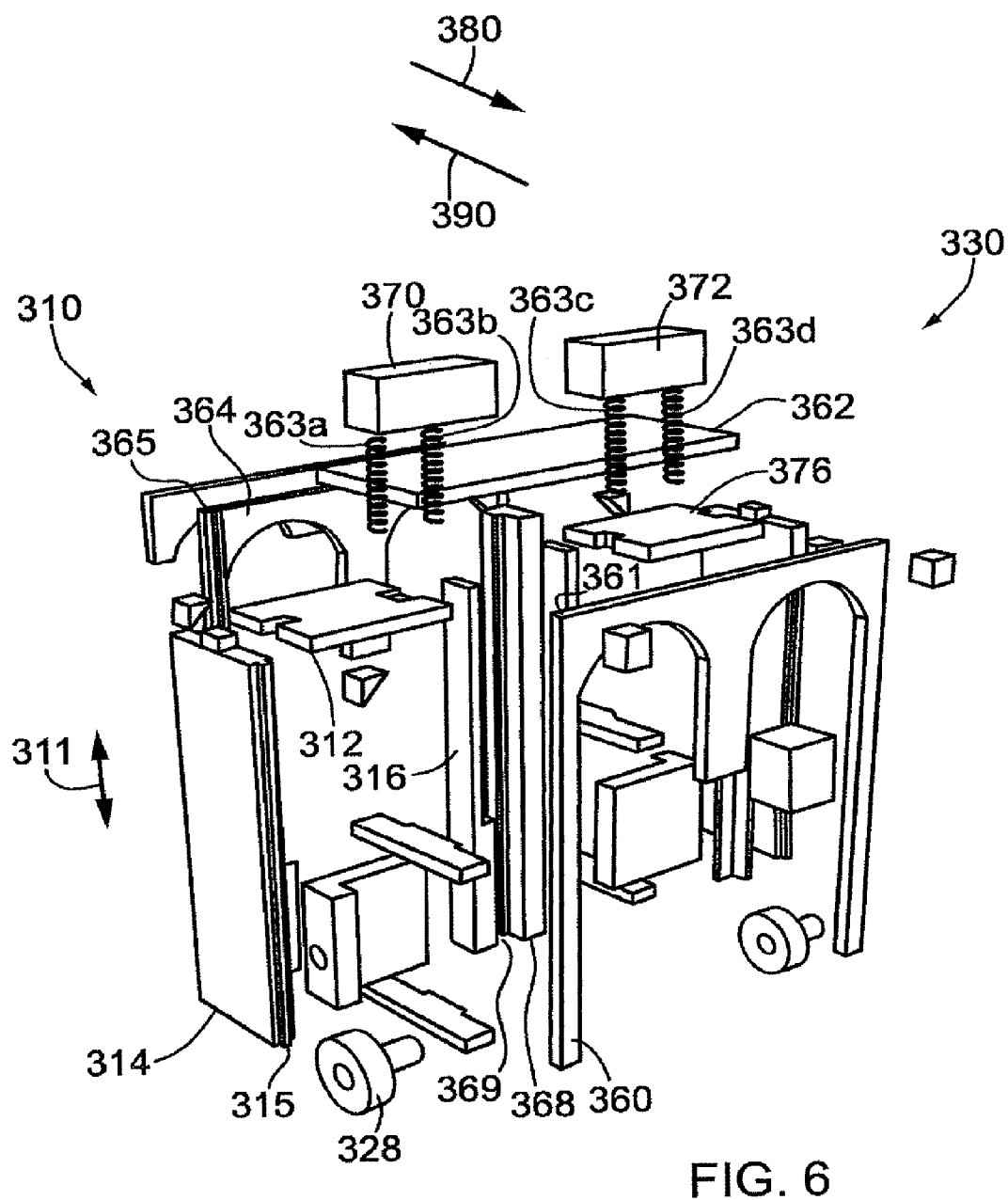
FIG. 6 shows in diagrammatic form a frame structure and the suspensions of each wheel for the motorized cycle of FIG. 1.

Reference is next made to FIG. 6 which shows how the left and right suspensions 310 and 330 of the motorized cycle 100 are connected to the frame according to an aspect of the present invention. As shown, the left suspension 310 comprises a top bracket 312, an outer slider 314 and an inner slider 316. Wheel pulley 328 is also shown in FIG. 5, however, the remaining portions of the motor assembly are excluded for illustrative purposes. As shown, the right suspension 330 comprises the same components as the left suspension 310. The frame comprises a front piece 360, a back piece 364, a top piece 362 and a center piece 368. Two supports indicated individually by references 370 and 372 are attached to the top piece 362.

As shown in FIG. 6, the outer slider 314 has an edge 315 that interfaces with the groove 361 on the front piece 360 of the frame. The outer slider 314 has a similar edge (not shown) that interfaces with the groove 365 of the back piece 364. The front (indicated by the direction of arrow 380) of the outer slider 314 includes a plurality of bearings or rollers (not shown) that allow the outer slider 314 to move in the direction of arrow 311 with little friction. In another aspect, the groove 361 of the front piece 360 has bearings or rollers (not shown) that allow the front piece 360 to move in the direction of arrow 311 with little friction or heat loss in relation to the outer slider 314. In yet another aspect of the present invention, the interface between the edge 315 of the outer slider 314 and the groove 361 of the front piece 360 is lubricated with or without bearings. The inner slider 316 of the left suspension 310 is connected to the center piece 368 of the frame with a similar groove-edge connection. The groove 369 of the center piece 368 interfaces with an edge (not shown) of the inner slider 316 such that the inner slider 316 moves in the direction of arrow 311 in relation to the center piece 368. It will be appreciated that the edges and grooves can be on either the frame or the suspensions 310 and 330 and that bearings can be attached to either the suspensions 310 and 330 or the frame or both.

As shown in FIG. 6, supports 370 and 372 are mounted on the top piece 362 of the frame. A set of springs indicated individually by 363a, 363b, 363c and 363d are attached to supports 370 and 372. The other ends of springs 363a and 363b are attached to the top bracket 312. In another embodiment, the springs are attached to top bracket 312 but are free-floating on the other end. As the suspensions 310 and 330 move up and down in relation to each other in the direction of arrow 311, the springs 363a-363d extend or compress. In one aspect, the springs 363a-363d are counter-sunk a certain distance into supports 370 and 372 to prevent the springs from being fully compressed which may cause damage. In other aspects, the springs may be attached to the top piece 362 and the top bracket 312 of the left suspension 310 and the top bracket 376 of the right suspension 330. In yet another aspect of the present invention, the suspensions 310 and 330 may include motor driven linear actuators, pneumatic cylinders or springs in parallel or series or any other system which allows linear motion such as a rack and pinion device.

Figure 7:
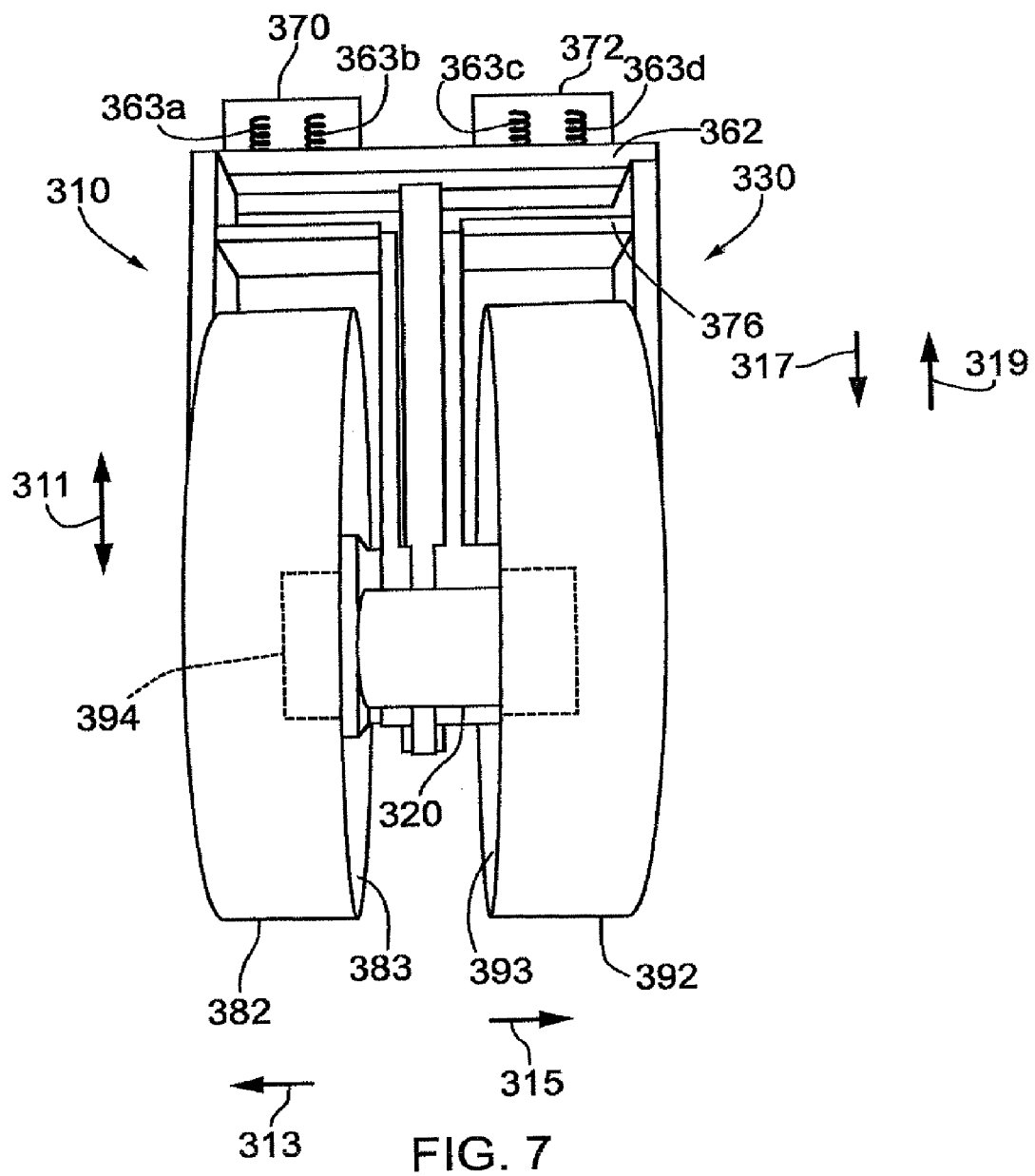
FIG. 7 shows in diagrammatic form a frame structure connected to the suspensions of each wheel for the motorized cycle of FIG. 1.

Reference is next made to FIG. 7 which shows in more detail the dual independent suspensions 310 and 330 with the wheels 382 and 392 respectively mounted according to an aspect of the present invention. As shown, the motor 320 that drives the wheel 382 lies partially within the hollow area 393 of the wheel 392. Likewise, the motor 394 that drives the wheel 392 lies partly within the hollow area 383 of the wheel 382. The motor 320 is offset from the center of each wheel and drives the wheel 382 as described above using a pulley system. This arrangement optimizes the use of space and allows the wheels 382 and 392 to be positioned dose together. The frame and the suspensions 310 and 330 are designed so that the motor 320 will not interfere with the wheel 392 even if the suspensions 310 and 330 are displaced from each other to the maximum extent in the direction of arrow 311. Also shown in FIG. 7 are springs 363a-363d. In yet another aspect of the present invention, suspensions 310 and 330 are coupled to the top piece 362 via a 360-degree bearing or other type of pivot which allows the suspensions 310 and 330 to move around the pivot point of the bearing. This arrangement allows the wheels 382 and 392 to move in the direction of arrow 311 and also in a circular radius about a pivot as will be described in more detail with reference to FIGS. 9-11.

FIG. 7 is also illustrative of the relative movement of the suspensions 310 and 330 while the rider is leaning to the left (indicated by reference 313) or the right (indicated by arrow 315). If the rider leans to the left in the direction of arrow 313, the top piece 362 will move down in the direction of arrow 317 relative to the left suspension 310 which causes springs 363a and 363b to compress. The top piece 362 will move up in the direction of arrow 319 relative to the right suspension 330 which causes springs 363c and 363d to extend. As is described in more detail below, the rotation of wheel 392 is caused to accelerate by software, which, in turn causes the motorized cycle 100 to turn in the direction of arrow 313. It will be appreciated that, in a corresponding way, the motorized cycle 100 will turn in the direction of arrow 315 when the rider leans in the direction of arrow 315. In this case, the rotation of wheel 382 is caused to accelerate causing the motorized cycle 100 to turn to the right in the direction of arrow 315.

Figure 8:
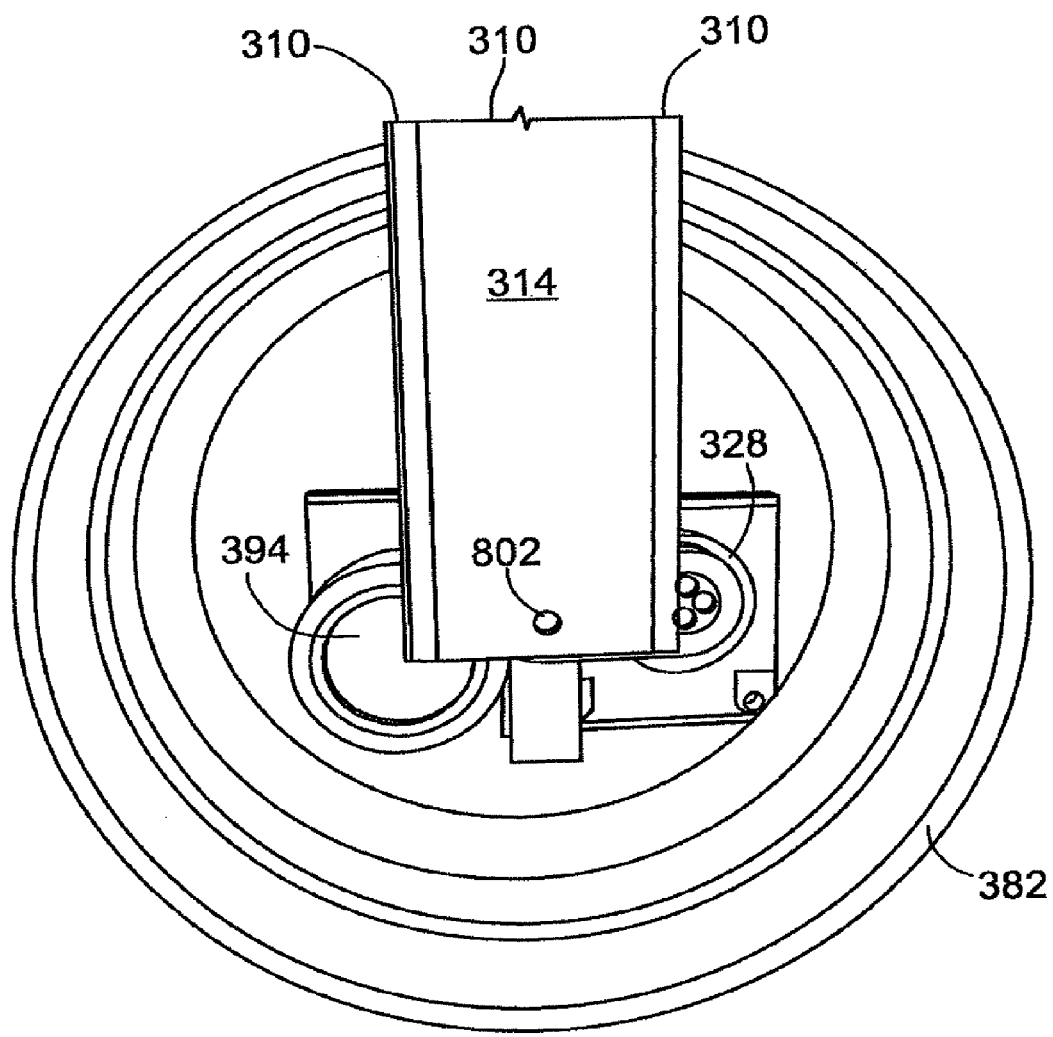
FIG. 8 shows in diagrammatic form a side view of a wheel connected to its related suspension for the motorized cycle of FIG. 1.

Reference is next made to FIG. 8 which shows the wheel 382 mounted to the suspension 310 according to one embodiment of the present invention. As shown, wheel 382 interfaces with the outer slider 314 of the suspension 310. A shaft 802 is coupled between the outer slider 314 and the wheel pulley 328. Motor 320 drives the wheel pulley 328, which in turn drives the wheel 382 while the shaft 802 remains stationary.

FIG. 8 also shows the motor 394 which drives the wheel 392. As described above, the motor 394 lies partly within the hollow portion 383 of wheel 382 which allow the wheels 382 and 392 to be positioned close together.

Figure 9:
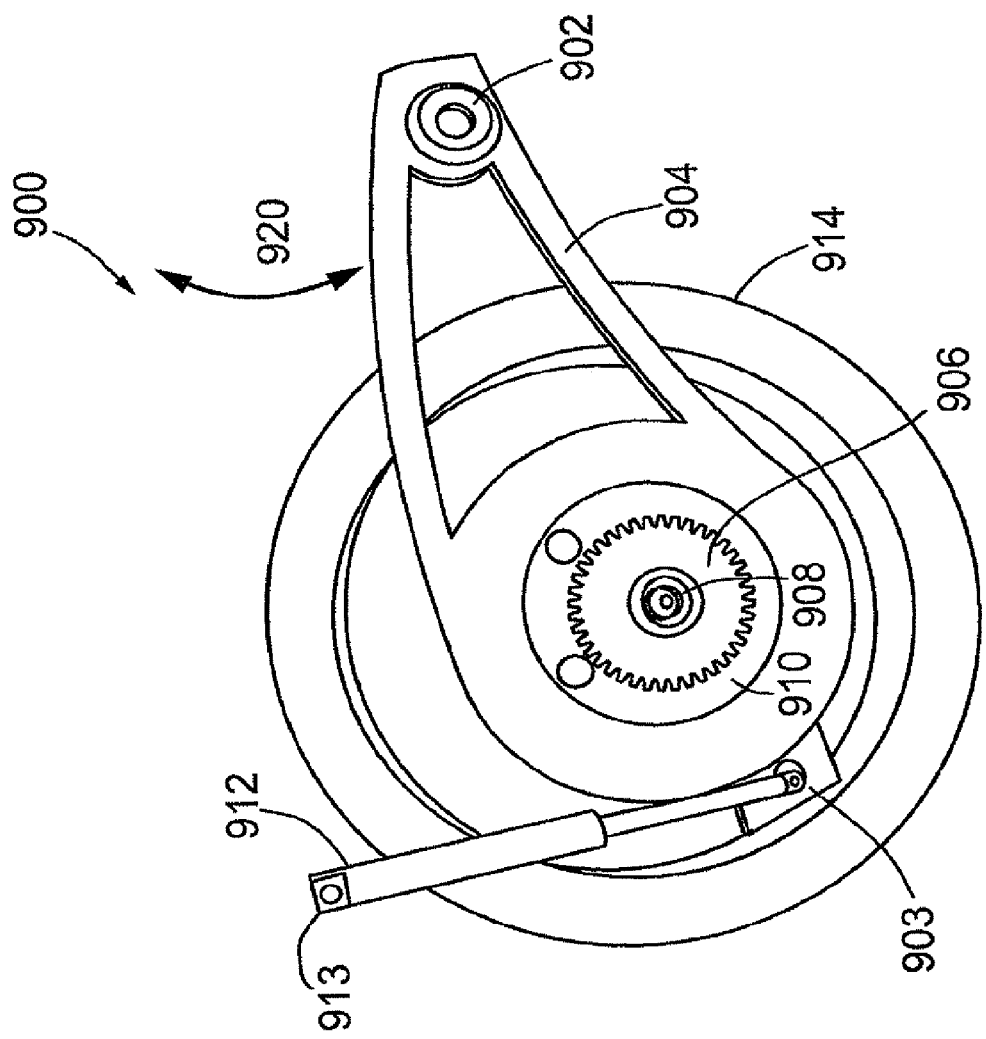
FIG. 9 shows in diagrammatic form a suspension for the motorized cycle of FIG. 2.

FIG. 9 illustrates a suspension 900 of a single wheel of the motorized cycle 200 according to another embodiment of the present invention. A suspension system that comprises a plurality of suspensions such as the one indicated by reference 900 for the motorized cycle 200 is illustrated in more detail in FIGS. 10 and 11. The suspension 900 comprises a swing arm 904, a gear 906, a shaft 908, a swing arm mount 910 and a wheel 914. The swing arm 904 is an element that is connected to the frame 216 of the motorized cycle 200 at the pivot 902. Generally, the pivot 902 of the suspension 900 is located at the front component 220 of the motorized cycle 200 and above the axis of the wheel 914. The pivot 902, however, can also be attached to other parts of the frame 216. As will be appreciated, the swing arm 904 can be coupled to the frame 216 using any of numerous connections (such as roller bearings or on an axis) that will allow the swing arm 904 and the suspension 900 to rotate about the pivot point 902 in the direction of arrow 920. The gear 906 is driven by a motor (not shown) via a fink (not shown) such as a chain or a belt. The gear 906 drives the shaft 908 which in turn drives the wheel 914 in a manner that is known. The swing arm 904 is coupled to the swing arm mount 910 which does not rotate, but remains fixed within the hollow portion 915 of wheel 914.

FIG. 9 also illustrates a shock absorber 912 that is coupled to the frame 216 at point 913 and to the swing arm 904 at mount 903. As the suspension 900 moves in the directions of arrow 920, the shock absorber 912 extends or compresses. The shock absorber 912 is operable to cushion the movement of the suspension 900 and provides a smoother ride for the rider. As will be appreciated, springs, linear actuators, pneumatic cylinders or any other dampening element may be used in conjunction with shock absorber 912 or in place of shock absorber 912. Any number of dampening elements may be used to cushion the movement of suspension 900 in the movement of arrow 920. In yet a further aspect, sensors (not shown) detect the real-time deflection of the swing arm 904 while the motorized cycle 200 is in use. The sensors send signals to a control board (not shown) which runs a software application. In this embodiment, the software sends instructions to linear actuators coupled to the swing arm 904 to ensure the smoothness of the riding experience for the rider of the motorized cycle 200.

Figure 10:
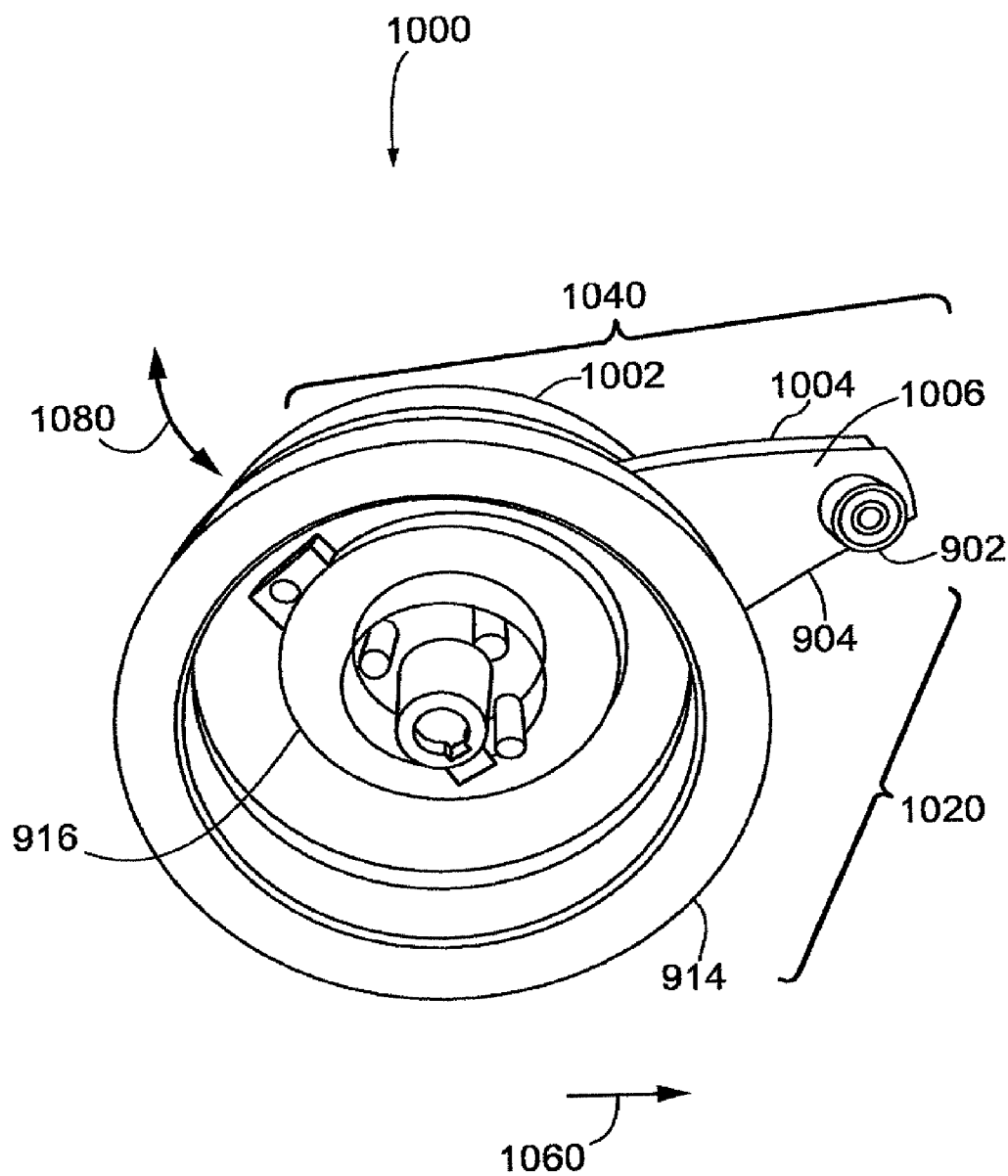
FIG. 10 shows in diagrammatic form a suspension system for the motorized cycle of FIG. 2.

Reference is next made to FIG. 10 which shows a dual independent suspension system for the motorized cycle 200 according to an embodiment. The dual independent suspension system, indicated generally by reference 1000 comprises two suspensions (i.e. a suspension for each wheel) indicated individually by references 1020 and 1040. As shown, the pivots 902 and 1006 of the suspensions 1020 and 1040 respectively are located to the front of the motorized cycle 200 indicated by arrow 1060 and above the axis of the wheels 914 and 1002. In general, pivots 902 and 1006 are coupled to the frame 216 such that suspensions 1040 and 1020 are moveable about the same radius indicated by arrow 1080. The suspension system 1000 comprises swing arms 904 and 1004, pivots 902 and 1006 and wheels 914 and 1002. The swing arm mount 916 for coupling the swing arm 904 to the shaft 908 of the suspension 1020 is also shown.

As shown, the swing arms 904 and 1004 are connected to the inside of the wheels 914 and 1002 respectively. In another aspect, the swing arms 904 and 1004 are connected to the outside of the wheels 914 and 1002. In this aspect, the wheels 914 and 1002 are able to be positioned next to each other with very little space between them. Such a configuration further decreases the width of the motorized cycle 200 and allows the motorized cycle 200 to be stored or parked in smaller spaces. The narrower distance between wheels 914 and 1002 provides a narrower wheel base for the motorized cycle 200 and allows the rider to perform turns in a smaller radius than when the wheels 914 and 1002 are further apart.

Figure 11:
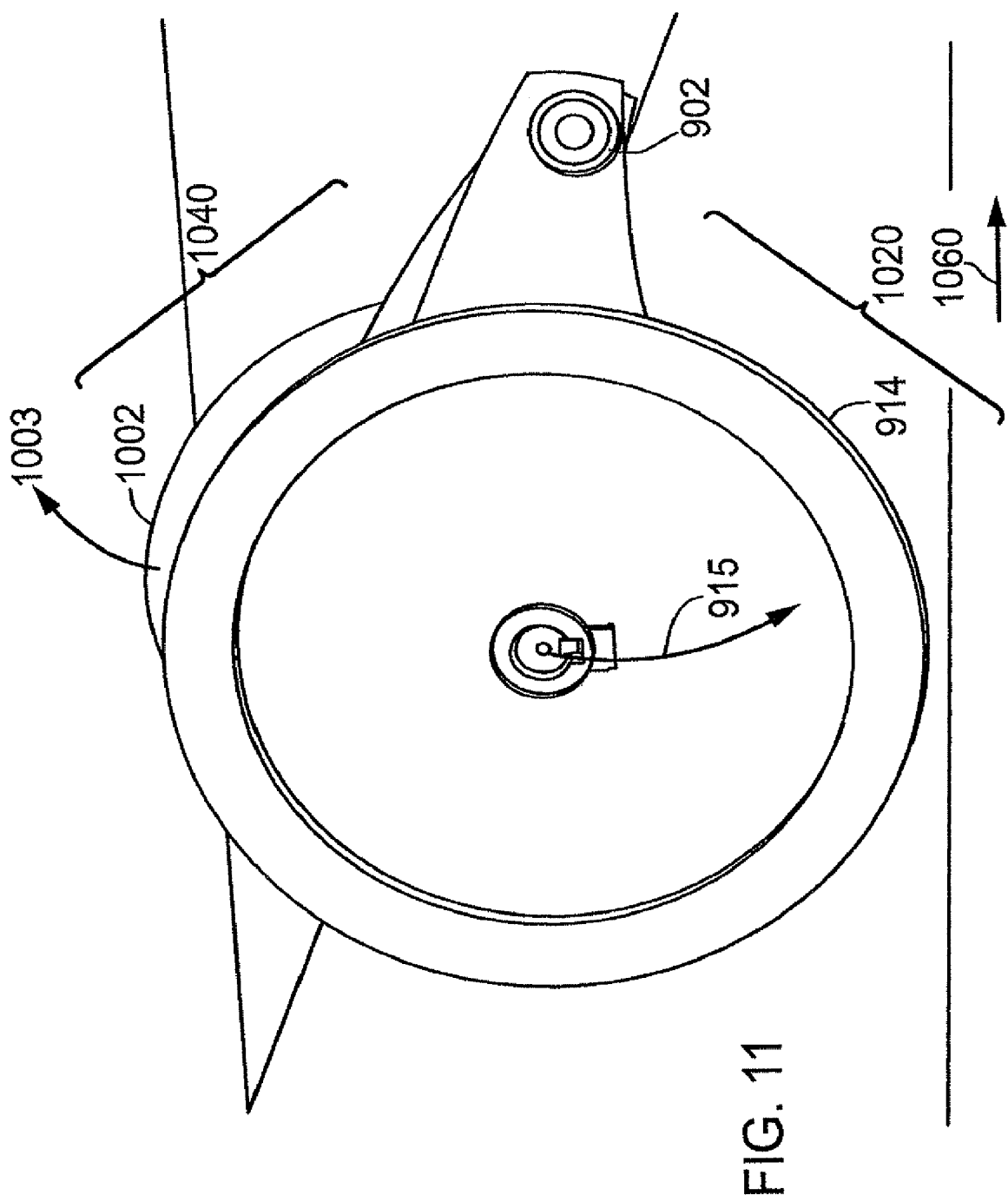
FIG. 11 shows in diagrammatic form the movement of the suspensions in relation to each other for the motorized cycle of FIG. 2.

Reference is next made to FIG. 11 which illustrates the movement the suspensions 1020 and 1040 of the motorized cycle 200 relative to each other according to an aspect of the present invention. As shown, the pivot 902 of the suspensions 1020 and 1040 is located to the front of the motorized cycle 200 which is indicated by arrow 1060. If the rider leans to the right, relative to the front of the motorized cycle 200, the suspension 1020 moves down and back relative to the suspension 1040 in the direction of arrow 915. In the direction of travel indicated by arrow 1060, the suspension 1040 is now forward relative to the suspension 1020 in the direction of arrow 1003 and the wheels 914 and 1002 are now offset (i.e. the axis of the wheels 1020 and 914 are not on the same line). The dual independent suspension system shown in FIG. 11 allows the motorized cycle 200 to turn in a tighter radius than when the wheels 914 and 1002 are not offset and retains the stability of the motorized cycle 200 as it travels on uneven surfaces as shown in FIG. 3(a), 3(b) and 4. The offset dual independent suspension system illustrated in FIGS. 9-11 and the non-offset dual independent system illustrated in FIGS. 5-8 are two aspects of the present invention.

Rider Positioning System of the Motorized Cycle

Figure 12:
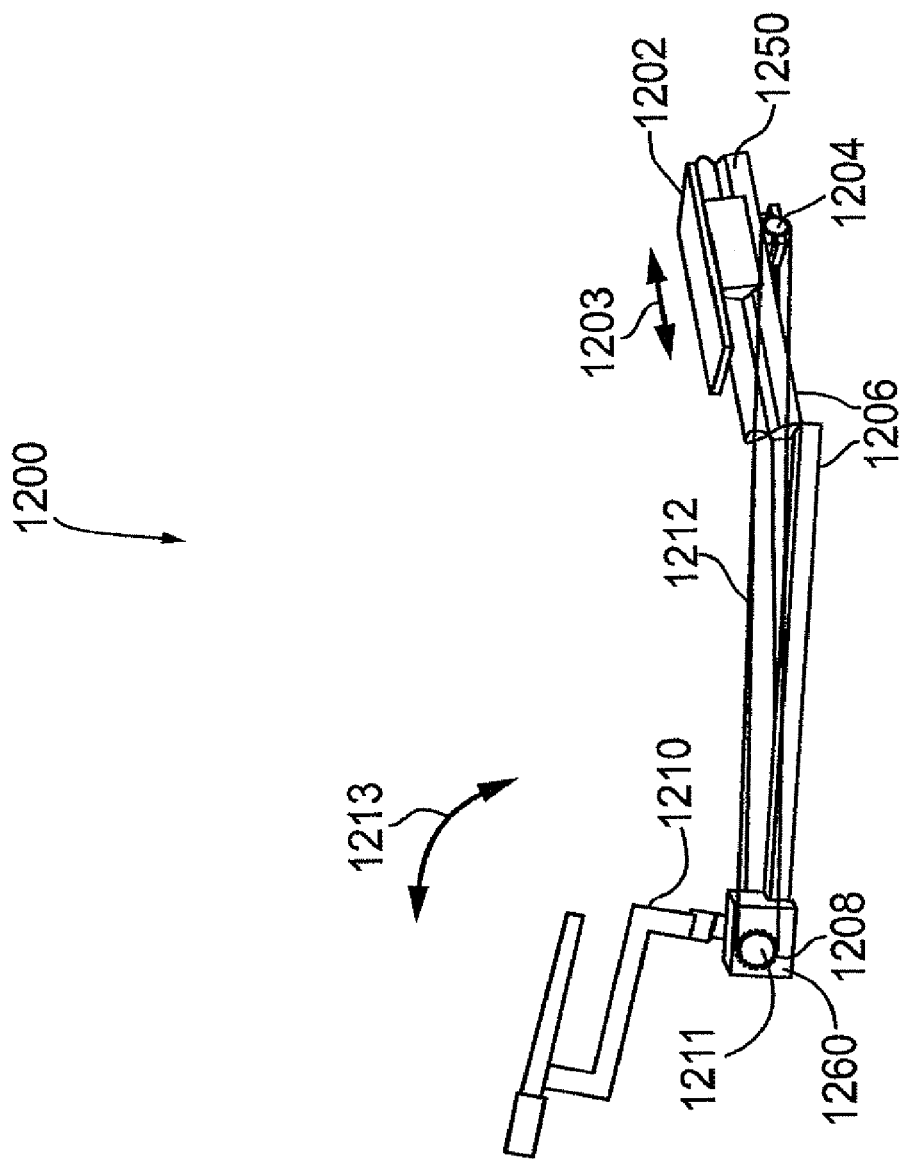
FIG. 12 shows in diagrammatic form a rider positioning system for the motorized cycle of FIG. 2.

FIG. 12 illustrates a rider positioning system 1200 for the motorized cycle 200 according to one embodiment of the present invention.

Figure 13:
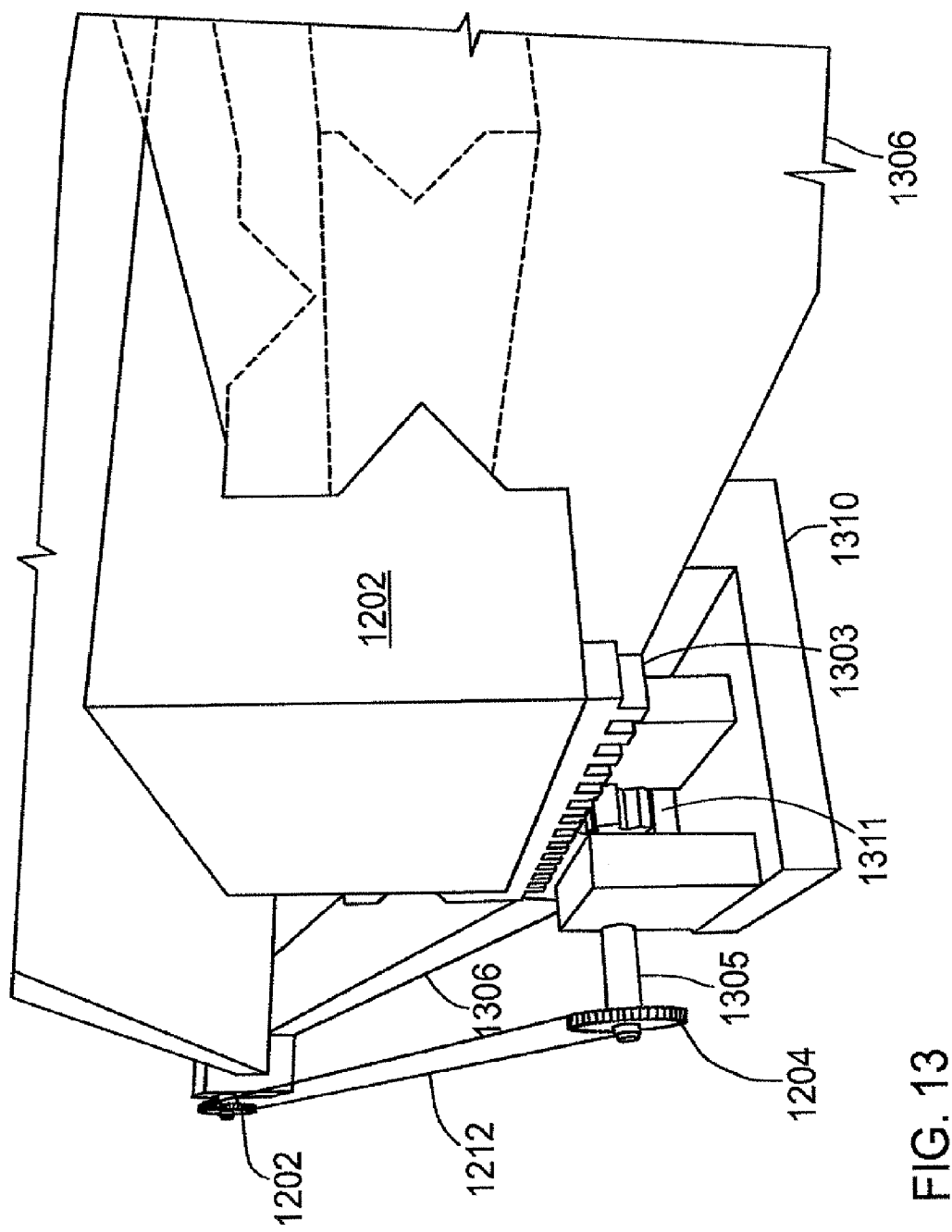
FIG. 13 shows in diagrammatic form a rear view of a rider positioning system for the motorized cycle of FIG. 2.

The rider positioning system 1200 comprises a seat mount 1202, a seat gear 1204, a link 1212, a frame 1206, a handle bar gear 1208 and handle bars 1210. The frame 1206 includes a back component 1250 and a front component 1260. The handle bars 1210 are attached to the frame 1206 and are able to rotate about the pivot point 1211 relative to the frame 1206 in the directions of arrow 1213. The seat mount 1202 supports a seat (not shown) and is moveable in the directions of arrow 1203 along the frame 1206. To operate the motorized cycle 200, the rider sits down on the seat and takes a hold of handle bars 1210. The rider is able to move handle bars 1210 in the direction of arrow 1213 to control the speed of the motorized cycle. As shown, the seat gear 1204 and the handle bar gear 1208 are mechanically operatively connected via the link 1212 which is generally a belt or chain but may be any other suitable link. When the rider moves the handle bars in the directions of arrow 1213, the link 1212 causes the seat gear 1204 to rotate. The seat mount 1202 includes a rack and pinion element which is shown in FIG. 13. As the seat gear 1204 rotates, the seat mount 1202 moves in the corresponding path illustrated by arrow 1213 and in the opposite direction that the handle bars 1213 move in response to the movements of the rider. For example, if the rider pulls the handle bars 1210 towards the back component 1250 of the frame 1206, the seat mount slides towards the front component 1260 of the frame 1206. It will be appreciated that the seat mount slides towards the back component 1250 of the frame 1205 when the rider moves the handle bars toward the front component 1260 of the frame 1206. In this embodiment, the rider is able to position himself or herself in a fully seat position (i.e. when seat mount 1202 and handle bars 1210 are close together) or in a lying down position (i.e. when the seat mount 1202 and handle bars 1210 are far apart). Any position in between fully seated and lying down is possible depending on what is desired by the rider for comfort and/or to control the motorized cycle 200.

In a further aspect, the seat gear 1204 is operatively connected to the handle bar gear 1208 such that seat mount 1202 moves in the same direction as the handle bars 1210. In this aspect, when the handle bars 1210 are pushed toward the front component 1260 of the frame 1206, the seat mount 1202 also moves toward the front component 1260 of the frame 1206.

Likewise, when the handle bars 1210 are pulled toward the back component 1250 of the frame 1206, the seat mount 1202 also moves toward the back component 1250 of the frame 1206

Reference is next made to FIG. 13, which shows a rear view of one embodiment of the rider positioning system 1200 for the motorized cycle 200 according to an aspect. As shown, seat gear 1204 is mechanically coupled to handle bar gear 1208 via the link 1212. As the seat gear 1204 is driven by the link 1212 in response to the rider moving the handle bars 1210, the seat gear 1204 rotates the shaft 1305 which in turn causes the pinion 1311 to rotate. The pinion 1311 interfaces with the rack 1303 which is a component of or mounted to the seat mount 1202. The rotation of the pinion 1311 causes the rack 1303 and the seat mount 1202 to move along the path indicated by arrow 1203. The seat mount 1202 slides on the frame 1206. As will be appreciated the seat mount 1202 may slide on bearings, lubrication or in numerous other ways. The seat gear 1204, the shaft 1305 and the pinion 1311 are supported on the mount 1310 which is coupled to the frame 1206.

Figure 14:
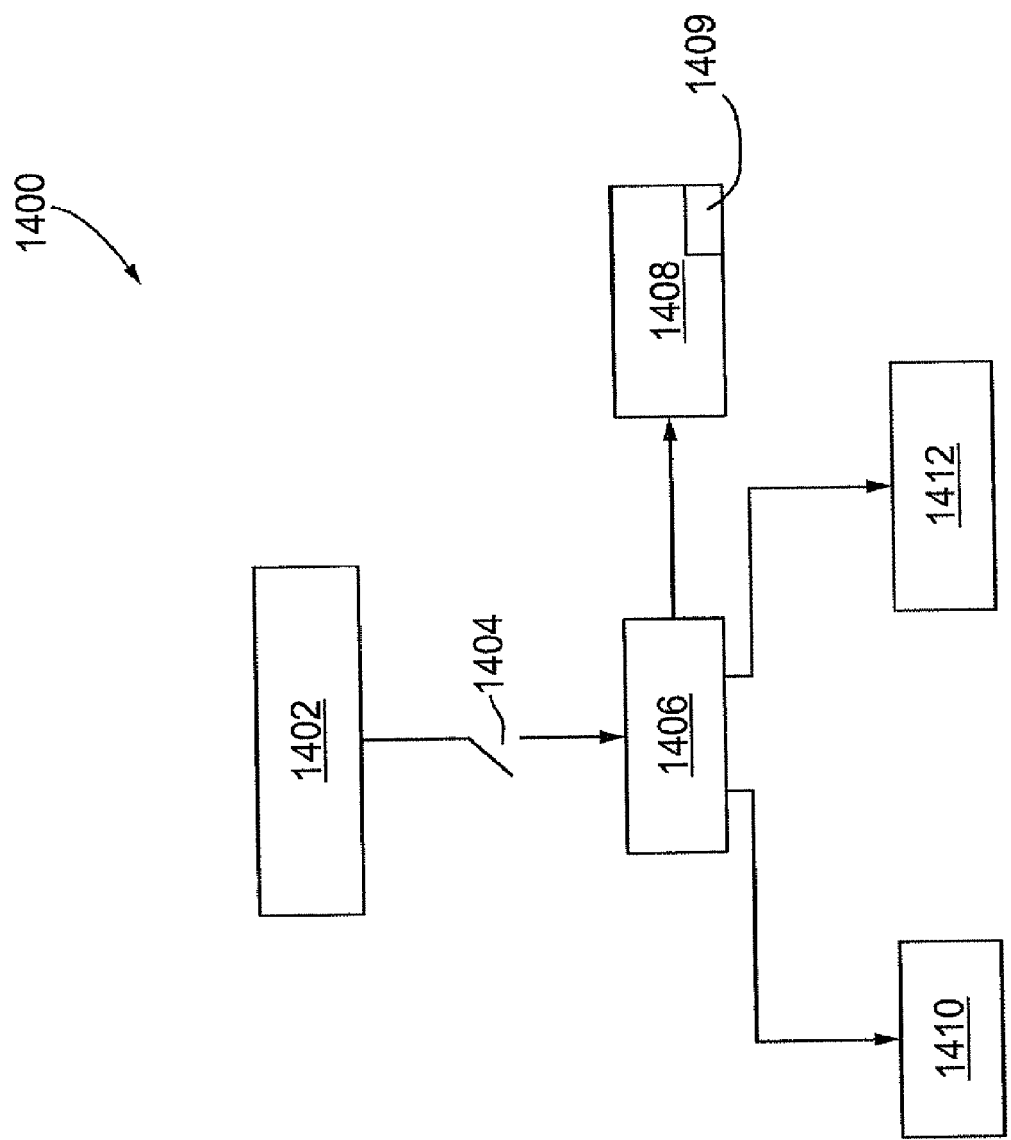
FIG. 14 shows in block diagram form an electrical wiring diagram for the motorized cycle of FIGS. 1 and 2.

In another aspect of the rider positioning system 1200 of the motorized cycle 200, the handle bars 1210 may be operatively connected to the seat mount 1202 via electrical and/or programmatic means. As the rider exerts a force on the handle bars 1210, a signal may be sent to a control board (not shown) which instructs an actuator (not shown) to adjust the seat along the path of arrow 1203. In a further aspect, the handle bars 1210 are able to move in a straight line instead of rotating about the pivot 1211. In yet another aspect, the rider is able to move only the seat mount 1202 or the handle bars 1210, but not both. In yet another aspect, the rider may adjust the handle bars 1210 and the seat mount 1202 and lock one or both into place as the rider is driving. Such an embodiment is akin to cruise control on a car and allows the rider to stay in the same position (and thus travel at the same speed) for as long as desired, Power Source, Electronics and Software of the Motorized Cycle FIG. 14 illustrates the electrical system of the motorized cycle of the present invention. The electrical system indicated generally by reference 1400 comprises one or more batteries (i.e. a battery pack) 1402, an on/off switch 1404, a transformer 1406, a control board 1408 and motors 1410 and 1412. The control board 1408 generally includes at least one integrated circuit (not shown) that is loaded with software 1409 for controlling the speed of the motors 1410 and 1412. As shown, the motorized cycle is powered by a rechargeable battery pack 1402 that is commonly available. The transformer 1406 is operable to transform the characteristics of the power provided by battery pack 1402 for the control board 1408 and the motors 1410 and 1412, if necessary. In others aspects, the motorized cycle of the present invention may be powered by fuel cells, hydrocarbons, or solar power.

The battery pack 1402 may be recharged by plugging a power cord connected to the battery pack 1402 into a standard power outlet. According to another aspect, the life of the battery pack 1402 and thus the range of the motorized cycle of the present invention is increased by using the resistance energy generated in the mechanical systems of the motorized cycle to recharge the battery pack 1402 while the motorized cycle is in use.

As shown in FIG. 14, the battery pack 1402 provides power to the transformer 1406, the control board 1408 and motors 1410 and 1412. The on/off 1404 switch lies between the power sources (In this aspect, the battery pack 1402) and the other active components of the motorized cycle. When a rider turns the on/off switch 1404 to the "on" position, the battery pack 1402 provides power to the transformer 1406 which in turn provides power to motors 1410 and 1412 and the circuit board 1408.

Figure 15:
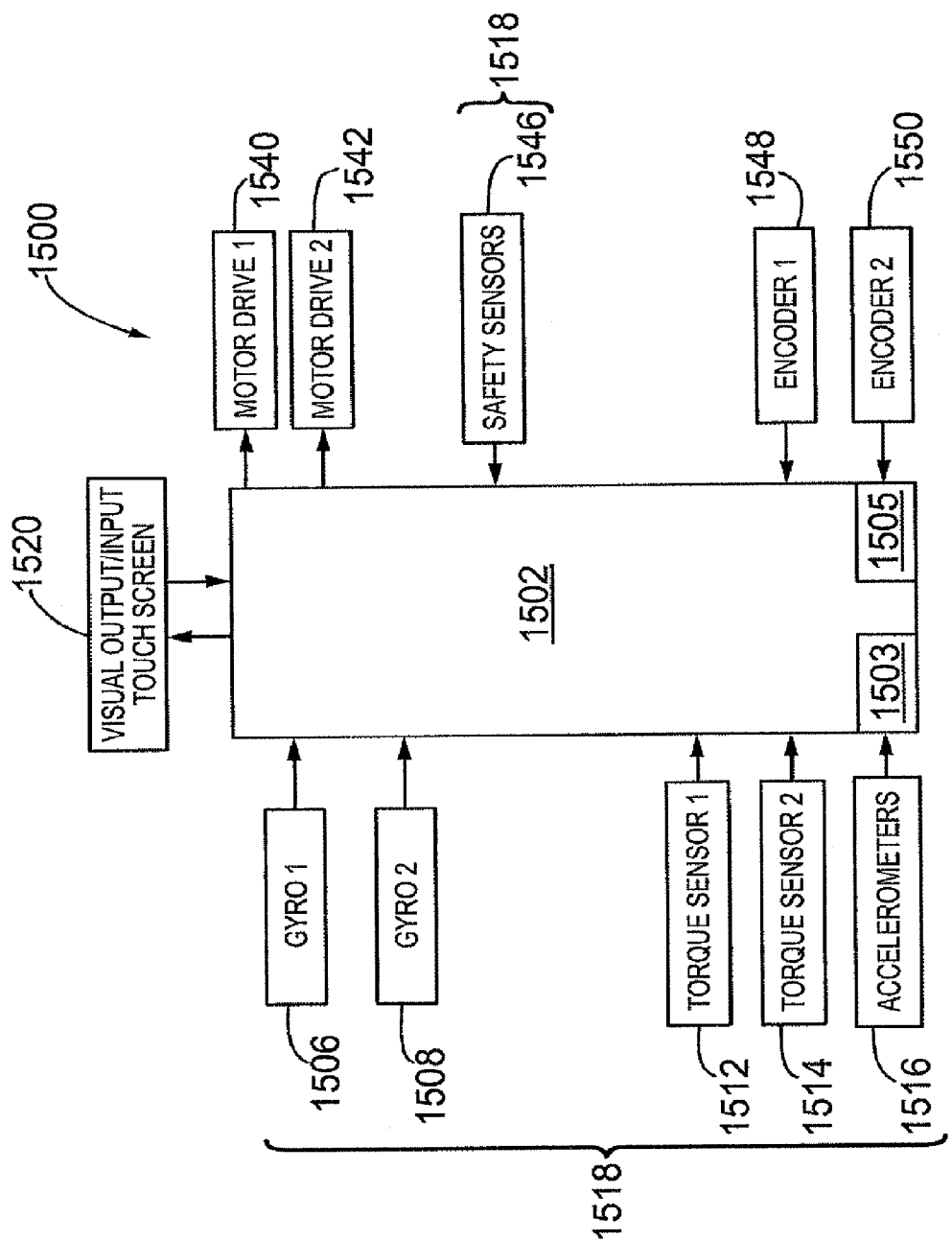
FIG. 15 shows in block diagram form a control system for the motorized cycle of FIGS. 1 and 2.

Reference is next made to FIG. 15 which illustrates in block diagram form the control system 1500 for the motorized cycle of the present invention. As shown, the control board 1502 receives inputs from a variety of sensors such as gyroscopes 1506 and 1508, safety sensors 1546, torque sensors 1512 and 1514 and accelerometers 1516. The sensors are collectively referred to by reference 1518. In practice, any positioning or physical sensor, or combination thereof, may be used to provide inputs to the control board 1502 of the motorized cycle of the present invention. The control board 1502 has a sampling crystal 1503 that samples the inputs from the sensors 1518 at a certain frequency, for example 250 samples/second. In general, the sampling crystal 1503 will sample signals from the sensors at a rate that is sufficient to compensate for even the quickest changes in the physical position of the motorized cycle. As shown, the control board 1502 may interface with an input/output device 1520 for interaction with the rider. The input/output device 1520 may be a visual and/or audio device that conveys information to the rider (such as speed, safe operation of all systems, etc.). The input/output device 1520 may also receive information from the rider such as mode of use (i.e. cruise control, self-balancing parking, etc.), or to switch on options such as a radio (not shown) or headlights (not shown). Software 1505 is loaded on the control board 1502. The control board 1502 passes the input signals from the sensors 1518 to the software 1505 which runs a routine which operates to maintain the center of gravity of the motorized cycle. To maintain the center of gravity of the motorized cycle, the software 1505 instructs the motors 1540 and 1542 to speed up or slow down depending on the position of the rider. As shown, the control board 1502 receives signals from safety sensors 1546 that indicate whether the systems of the motorized cycle are in proper working order. In an aspect, the motorized cycle of the present invention is not able to operate while crucial systems (such as the batteries) are not working properly. In a further aspect, the rider is notified of safety problems on the input/output device 1520.

Continuing to reference FIG. 15, the software 1505 residing on the control board 1502 continually samples the safety sensors 1546 when the motorized cycle is in operation. If a critical error occurs while the motorized cycle of the present invention is moving then the software 1505 may activate any one of several emergency systems. An emergency includes any instance in which the motorized cycle is no longer capable of maintaining its speed or the rider's stability. The motorized cycle includes an array of capacitors (not shown) that recharge as the motorized cycle is in operation. When the software 1505 detects an emergency situation the capacitors will discharge and provide enough power to bring the motorized cycle to a controlled stop.

As shown, the control board 1502 may receive input signals from encoders 1548 and 1550 that are coupled to motors 1540 and 1542. The encoders 1548 and 1550 monitor the rotational velocity of the motors 1540 and 1542 and input the rotational velocity in a discretized format to the control board 1502 and the software 1505. In an aspect, the software activates the emergency systems as described above if the rotational velocity of either motors 1540 or 1542 is not within a predefined range of the desired rotational velocity of motors 1540 or 1542. In a further aspect, software 1505 uses the difference between the actual rotational velocity and the desired rotational velocity of motors 1540 and 1542 as a calibration factor. The calibration factor may be added or subtracted to the rotational velocity at which motors 1540 and 1542 are instructed to rotate.

Figure 16:
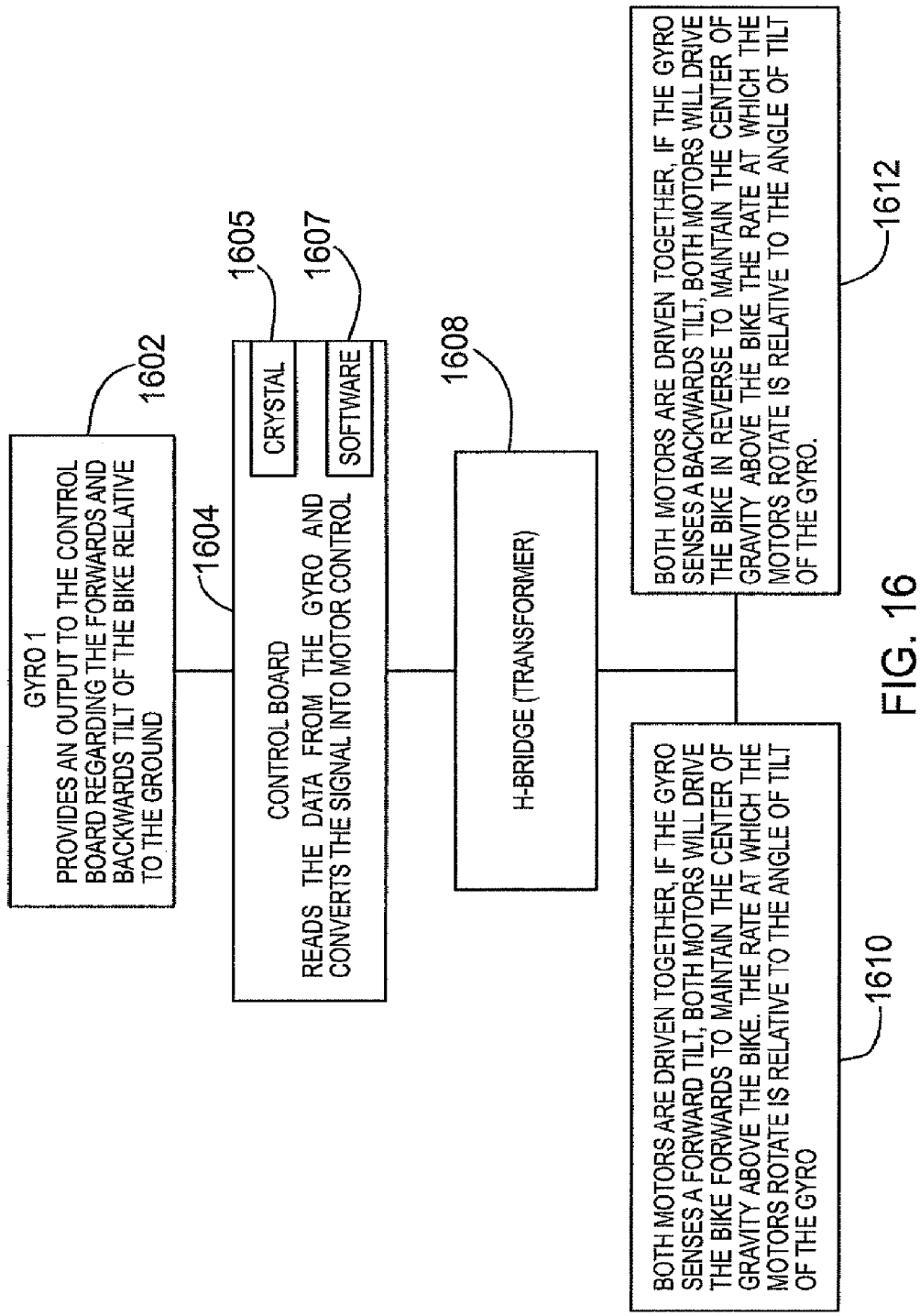
FIG. 16 shows in flowchart form the operation of the control system for the motorized cycle of FIGS. 1 and 2 as the motorized cycle tilts in the front-back direction.

FIG. 16 illustrates the operation of the motorized cycle in the forwards and backwards direction as defined by arrows 101a and 103a respectively according to an aspect of the present invention. Gyroscope 1602 provides a signal to the control board 1604 representing the tilt of the motorized cycle relative to the ground in the direction of arrows 101b and 103b. Software 1607 receives the tilt of the motorized cycle and executes an algorithm that instructs the motors 1610 and 1612 to rotate at a rotational velocity sufficient to maintain the center of gravity of the motorized cycle. Both motors 1610 and 1612 are driven together and the rotational velocity at which the motors 1610 and 1612 are instructed to rotate is relative to the signal provided by the gyroscope 1602. If gyroscope 1602 senses a forward tilt in the direction of arrow 101b, then software 1607 will instruct the motors 1610 and 1612 to accelerate to maintain the motorized cycle's center of gravity which causes the motorized cycle to travel in the direction of arrow 101a. If gyroscope 1602 senses a backward tilt in the direction of arrow 103b, then the software 1607 instructs motors 1610 and 1612 to decelerate to maintain the motorized cycle's center of gravity which causes the motorized cycle to either decelerate in the direction of arrow 101a or to accelerate in the direction of arrow 103a.

Figure 17:
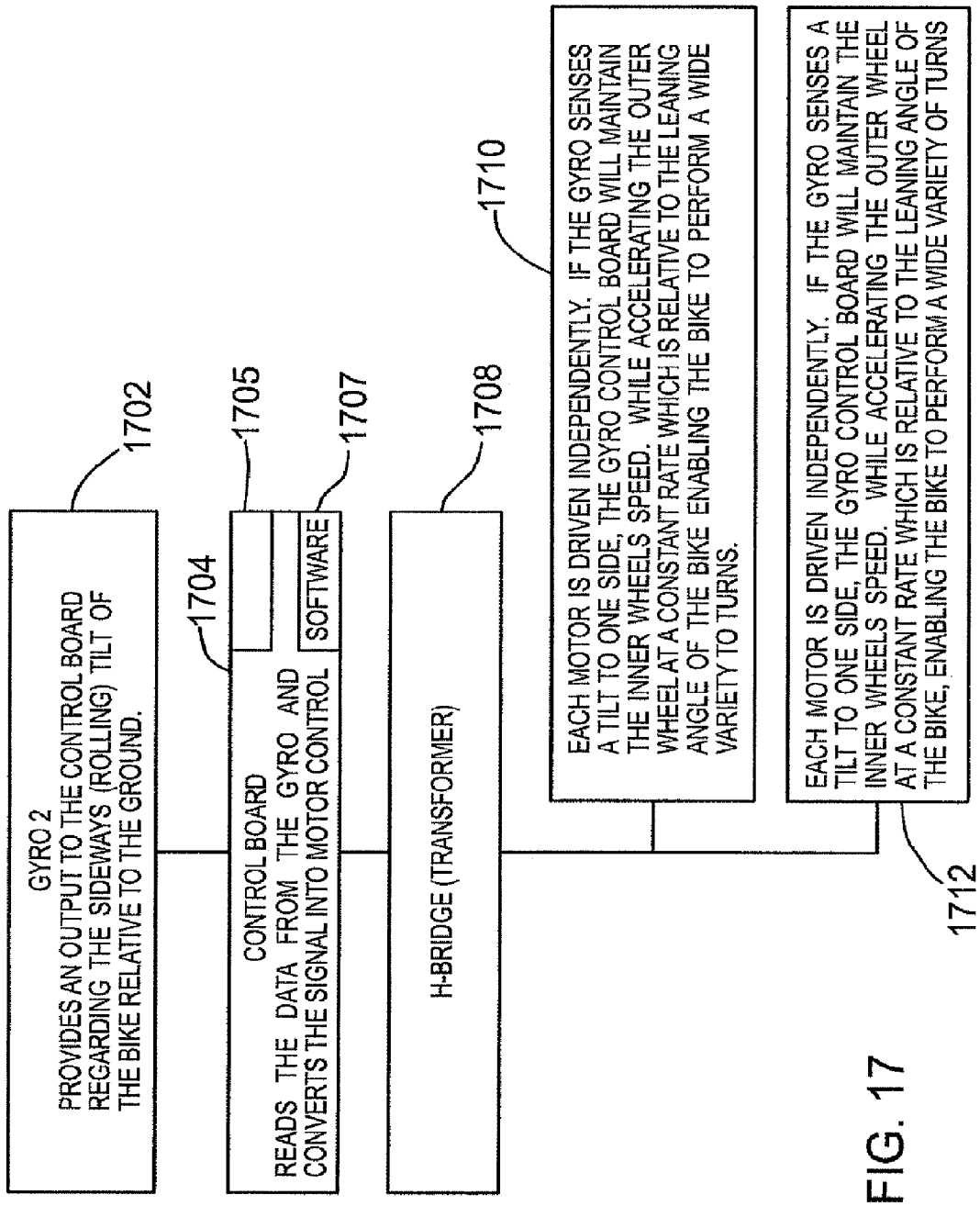
FIG. 17 shows in flowchart form the operation of the control system for the motorized cycle of FIGS. 1 and 2 as the motorized cycle tilts in the side to side direction.

Reference is next made to FIG. 17 which illustrates the operation of the motorized cycle in the side-to-side direction as defined by arrows 301a and 301b of FIGS. 3(a) and 3(b). Gyroscope 1702 provides a signal to the control board 1704 representing the tilt of the motorized cycle relative to the ground in the direction of arrows 301b and 303b. Software 1707 receives the tilt signal and executes an algorithm that instructs the motors to rotate at a rotational velocity sufficient to maintain the center of gravity of the motorized cycle. Each motor is driven independently. If gyroscope 1702 senses a tilt to one side, the software 1707 instructs the inner wheel (i.e. the wheel on the side the motorized cycle is tilting) to maintain its speed. The software 1707 instructs the outer wheel to accelerate its rotational velocity, enabling the motorized cycle to perform a wide variety of turns.

Figure 18:
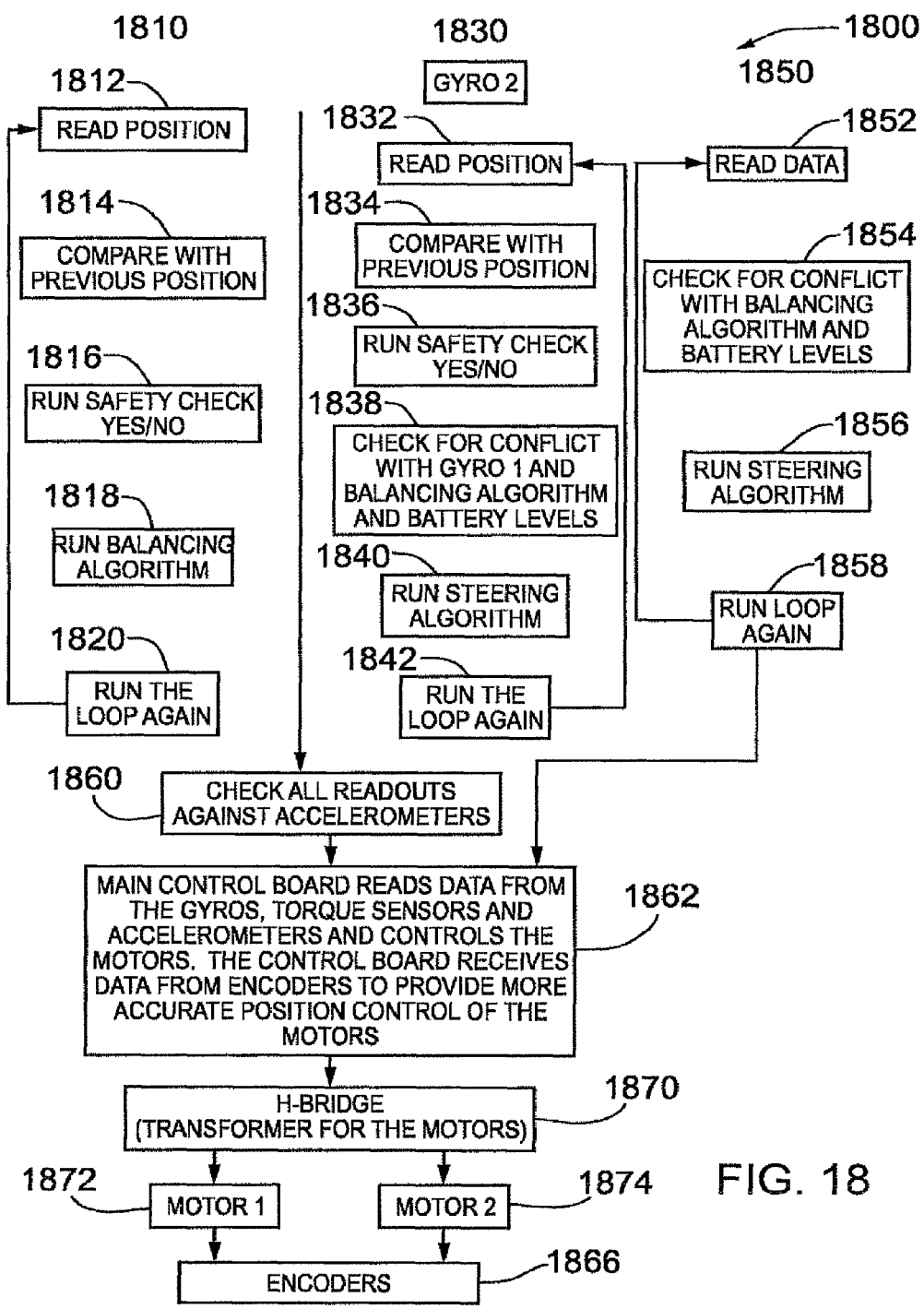
FIG. 18 shows in flowchart form the operation of the control system for the motorized cycle of FIGS. 1 and 2.

Reference is next made to FIG. 18 which illustrates the algorithm 1800 of the software according to an aspect of the present invention. The algorithm 1800 includes a sub-algorithm 1810 for balancing the motorized cycle in the direction of arrows 101b and 103b. A gyroscope senses tilt in the direction of arrows 101b and 103b. The control board 1862 reads (i.e. samples) the signal from the gyroscope at step 1812. The tilt of the motorized cycle in the direction of arrows 101b and 103b is compared to the previously read tilt in the direction of arrows 101b and 103b. At step 1816, a safety check is performed to ensure that the motors 1872 and 1874 are receiving power and are working properly. At step 1818, a balancing algorithm is executed to maintain the motorized cycle's center of gravity in the direction of arrows 101b and 103b. The balancing algorithm 1818 instructs the motors 1872 and 1874 to accelerate or decelerate as described in FIG. 16. At step 1820, the algorithm begins again starting with step 1812.

Also shown in FIG. 18 are the steps of a sub-algorithm for balancing the motorized cycle in the direction of arrows 3011, and 303b. A gyroscope senses tilt in the direction of arrows 301b and 303b. The control board 1862 reads the signal from the gyroscope at step 1832. The tilt of the motorize cycle in the direction of arrows 301b and 303b is compared to the previously read tilt in the direction of arrows 301b and 303b. At step 1836, a safety check is performed to ensure motors 1872 and 1874 are receiving power and are working properly. At step 1838, a conflict check is performed between the gyroscope sensing the tilt in the direction of arrows 101b and 103b and the gyroscope sensing the tilt in the direction of arrows 301b and 3013 at step 1834. The conflict check ensures that the motorized cycle maintains its center of gravity in all directions at all times. At step 1840, a steering algorithm is executed to maintain the motorized cycle's center of gravity in the direction of arrows 301b and 303b. The steering algorithm 1840 instructs the motors 1872 and 1874 to accelerate or decelerate as described in FIG. 17. At step 1842, the algorithm begins again starting with step 1832

As shown, the algorithm 1800 includes a torque sub-algorithm 1850. Torque sensors (not shown) sense the amount of torque exerted on the handle bars (not shown) by a rider. The control board 1862 reads the signal from the torque sensors at step 1852. At step 1854, a conflict check is performed to ensure that the motorized cycle maintains its center of gravity in the direction of arrows 101b and 103b and the direction of arrows 301b and 303b. A steering algorithm is executed at step 1856 to turn the motorized cycle in the direction of arrows 301a and 303a. The steering algorithm 1856 may execute in conjunction with steering algorithm 1840 or the algorithms 1856 and 1840 may execute independently.

At step 1860 the control board 1862 sample signals from accelerometers. The signals from the accelerometers are compared to the signals read by the gyroscopes in algorithms 1810 and 1830. If the readings from the accelerometers do not match the readings from the gyroscopes of algorithms 1810 and 1830, then the software may conduct an error checking analysis to determine if an emergency event has occurred or calculate a calibration factor. The calibration factor may be used to optimize the rotational velocity of motors 1872 and 1874, for example, by adding or subtracting to the rotational velocity at which the motors 1872 and 1874 are instructed to rotate.

The encoders 1866 also provide inputs to the control board 1862 representing the actual rotational velocity of the motors 1872 and 1874. The inputs from the encoders 1866 are verified against the rotational velocity at which the motors 1872 and 1874 are instructed to rotate. If either of the motors are not operating within a defined range, then the software may deploy emergency systems. The software may also calculate a calibration factor representing the difference between the real-time rotational velocity of the motors 1872 and 1874 and the rotational velocity at which the motors 1872 and 1874 are instructed to rotate.

Operating the Motorized Cycle

The general operation of the motorized cycle 100 is next described with reference to FIG. 1. A rider sits down on seat 106, places his or her legs on the ground and grabs handle bars 120. As shown in FIG. 1, the rider will be in a position similar to a motorcycle. To provide power to the motorized cycle, the rider turns an on/off switch (not shown) to the "on" position. To move in the forward direction indicated by arrow 101, the rider leans forward in the direction of arrow 101b and the motorized cycle 100 moves in the direction of arrow 101a at a speed in proportion to how far the rider is leaning. Similarly, if the rider wishes to move backward indicated by arrow 103a, he or she leans back in the direction of arrow 103b and the motorized cycle 100 will move in reverse in the direction of arrow 103a at a speed in proportion to the amount the rider is leaning. As the motorized cycle 100 begins to move forward indicated by arrow 101a, the rider can accelerate the motorized cycle 100 by increasing the amount he or she is leaning in the direction of arrow 101b. To decelerate, the rider leans backward in the direction of arrow 103b from his or her current position and the motorized cycle 100 will begin to slow down. If the rider leans backward in the direction of arrow 103b far enough, then the natural resistance in the gears of motorized cycle 100 and the friction between tires 110 and 116 and the contact surface will cause the motorized cycle 100 to come to a complete stop and eventually move backward in the direction of arrow 103a.

Turning the motorized cycle 100 is accomplished by the rider leaning to the same side that the rider wishes to turn. When the rider leans to one side, the outer wheel begins to rotate faster than the inner wheel causing the motorized cycle 100 to turn in the direction the rider is leaning. With reference to FIG. 1, when a rider leans to left side 140, tire 116 rotates faster than tire 110 causing the motorized cycle 100 to turn to the left relative to the front 130. The opposite occurs when a rider leans to the right side causing the motorized cycle 100 to turn to the right relative to the front 130. The radius at which the motorized cycle 100 turns is proportional to how far a rider leans to one side and when the rider stops leaning to either side then the motorized cycle 100 will proceed in a straight line.

According to an aspect of the present invention, the motorized cycle 100 maintains its center of gravity whether the rider leans to the front, back, right side or left side thus giving the rider complete control over the operation of the motorized cycle 100 without causing instability.

As shown, a rider will be in a motorcycle position according to the embodiment of FIG. 1. It will be appreciated that other seating or standing positions are possible in other embodiments of the present invention. For, example, other shapes for the body 102 can be used that put the rider in a "chair position", a standing position or in a low-seated motorcycle position.

It will be appreciated by those skilled in the art, that other embodiments of the present invention may include a throttle device that is used in cooperation with the operation described above. In this aspect, a throttle can supplement operating the motorized cycle based on the rider's position. In another aspect, a throttle can fully replace operating the motorized cycle based on the rider's position. For example, on long trips a rider may want to take a rest from moving back and forth and side-to-side. A switch mechanism can be engaged that allows the rider to use a throttle instead of his or her physical position. The rider can disengage the throttle at any time and resume operating the motorized cycle 100 according to body position.

In the embodiment of the present invention illustrated in FIG. 2., a rider is able to control the position of his or her body while the motorized cycle 200 is in operation. The handle bars 212 are operatively connected to the seat 209. The rider grabs hold of the handle bars 212 and can either move the handle bars 212 towards the front 220 or the back 222 of the frame 216 which causes the handle bars 212 to rotate in the direction of arrow 203. The seat 209 moves in conjunction with the handle bars 212. The rider may choose to maintain a seated position or a lying down position for greater control of the motorized cycle 200 or for comfort purposes. As described above, one or both the handle bars 212 and the seat 209 can be locked into place at any time. An arrangement where both the handle bars 212 and the seat 209 are locked into place is akin to cruise control as the motorized cycle 200 will maintain a constant speed. The rider can unlock one or both the handle bars 212 and the seat 209 at any time.

As the rider adjusts his or her position by maneuvering the handle bars 212, the motorized cycle 200 will either tilt in the direction of arrow 201a or in the direction of arrow 203a. If the rider leans forward in the direction of arrow 201b, the motorized cycle 200 will accelerate in the direction of arrow 201a. If the rider leans backward in the direction of arrow 203b, the motorized cycle 200 will decelerate in the direction of arrow 203a. The rider may choose to lean forward or backward by changing the position of handle bars 212 relative to the seat 209, or by locking the handle bars 212 and the seat 209 and operating the motorized cycle 200 in the manner described with respect to FIG. 1.

In yet another aspect, a potentiometer connected to the handle bars 212 provides a signal to the control board representing the angle of the handle bars 212 in the direction of arrow 203. The software of the control board uses the input from the potentiometer to calibrate the angle of the motorized cycle 200 in the direction of arrows 201b and 203b. The calibrated angle of the motorized cycle 200 is different than the actual tilt of the motorized cycle 200 in the direction of arrows 201b and 203b. The software uses the calibrated angle as an adjustment factor to increase or decrease the actual tilt of the motorized cycle 200 in the direction of arrows 201b and 203b. The rider may choose to move the handle bars 212 to adjust the actual tilt of the motorized cycle 200 for comfort or for better control of the motorized cycle 200. At all times, the stability of the motorized cycle 200 is maintained. In yet a further aspect, the potentiometer is connected to a throttle device connected to the handle bars 212.

In yet another aspect, torque sensors measure the amount of force exerted by a rider on the handle bars 212. The rider is able to maneuver the motorized cycle of the present invention by exerting force on the handle bars 212. In an aspect, the force exerted by the rider on handle bars 212 is used by the software in conjunction with the position of the rider in the direction of arrows 301b and 303b to maintain the center of gravity of the motorized cycle 200. In a further aspect, the rider may engage or disengage the torque sensors at any time or selectively program the software via the input/output device 1520 to increase or decrease the impact of the measured torque on the operation of the motorized cycle 200. For example, the rider may choose to steer the motorized cycle almost exclusively with the handle bars 212 with little impact of the rider's position in the direction or arrows 301b and 303b.

Storing the Motorized Cycle

The motorized cycle of the present invention may include numerous systems that ensure the stability and safety of the motorized cycle when it is not in use. A kickstand may extend from any part of the frame or body of the motorized cycle upon the activation of a parking switch or button. The kickstand may be spring-loaded, powered by a pneumatic cylinder, or may extend with gravity. For example, the kickstand may extend from body 102 or the frame 216 at the positions indicated by references 131 and 220 respectively.

In another aspect of the present invention, the motorized cycle is self-balancing. While the motorized cycle is operational, the rider engages a "stability" button or switch which sends a signal to the control board. The control board launches a routine that instructs one wheel to "lock" and the other wheel is instructed to adjust itself in increments until the motorized cycle is balanced. Gyroscopes or other sensors continually monitor the center of gravity of the motorized cycle and send input signals to the control board which are passed to the routine. Once the motorized cycle is balanced an indication (visual or audio) is given to the rider at which point the rider can turn off the motorized cycle which will remain in a balanced position.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A motorized cycle having a self balancing mode, the cycle comprising:
   a plurality of wheels disposed next to one another in the self-balancing mode;
   a suspension system coupling the wheels to a frame including
      one or more controlled actuators for controlling a lateral angle of lean of the frame relative to a surface supporting the cycle via the wheels;
   a wheel drive system for driving of the wheels permitting control of both a common rotation rate and a differential rotation rate of the wheels;
   a controller configured to provide control signals to the wheel drive system and the suspension system in the self-balancing mode
      to maintain front-to-back balance of the motorized cycle, and
      to respond to a steering command from a driver by imparting a differential rotational rate to the wheels, and by causing the one or more controlled actuators of the suspension system to impart an angle of lean of the frame into a turn;
   the cycle having an extended mode in which at least some of the wheels are displaced relative to one another in a front-to-back direction.

2. The motorized cycle of claim 1, wherein the wheels are laterally displaced relative to each other.

3. The motorized cycle of claim 1, wherein the wheels are aligned axially.

4. The motorized cycle of claim 3, wherein the wheels remain aligned axially during a lateral lean of the cycle.

5. The motorized cycle of claim 1, wherein the suspension system includes a plurality of controlled actuators, each associated with corresponding a suspension member of the suspension system, each suspension member being associated with a corresponding one of the wheels.

6. The motorized cycle of claim 1, wherein the one or more controlled actuators comprise a linear actuator.

7. The motorized cycle of claim 1, wherein the wheel drive system includes a plurality or motors, each associated with a corresponding one of the wheels.

8. The motorized cycle of claim 1, further comprising a handlebar for accepting a manual steering command from the driver and providing the steering command to the controller.

9. The motorized cycle of claim 1, wherein the controller is configured to concurrently provide control signals to the suspension system and the wheel drive system.

* * * * *